(12) United States Patent
Levene et al.

(10) Patent No.: US 7,095,418 B2
(45) Date of Patent: Aug. 22, 2006

(54) APPARATUS AND METHODS FOR TEXTURE MAPPING

(75) Inventors: Jonathan Levene, Somerville, MA (US); Marc Midura, Somerville, MA (US); Joshua Handley, Cambridge, MA (US)

(73) Assignee: SensAble Technologies, Inc., Woburn, MA (US)

(*) Notice: Subject to any disclaimer, the term of this patent is extended or adjusted under 35 U.S.C. 154(b) by 110 days.

(21) Appl. No.: 10/697,548

(22) Filed: Oct. 30, 2003

(65) Prior Publication Data

US 2005/0093874 A1    May 5, 2005

(51) Int. Cl.
*G06F 17/00* (2006.01)
*G06T 11/20* (2006.01)
*G09G 5/00* (2006.01)

(52) U.S. Cl. ............... 345/582; 345/581; 345/441; 345/619

(58) Field of Classification Search ........ 345/418–420, 345/424–428, 581–584, 587, 592, 619, 633, 345/552, 650–656, 173, 179, 441, 473, 474, 345/16
See application file for complete search history.

(56) References Cited

U.S. PATENT DOCUMENTS

| | | | |
|---|---|---|---|
| 3,531,868 A | 10/1970 | Stevenso | 33/174 |
| 3,920,972 A | 11/1975 | Corwin et al. | 235/151.1 |
| 3,944,798 A | 3/1976 | Eaton | 235/161.3 |
| 4,521,685 A | 6/1985 | Rebman | 250/229 |
| 4,604,016 A | 8/1986 | Joyce | 414/7 |
| 4,632,341 A | 12/1986 | Repperger et al. | 244/230 |
| 4,638,798 A | 1/1987 | Shelden et al. | 128/303 B |
| 4,653,011 A | 3/1987 | Iwano | 364/513 |
| 4,654,648 A | 3/1987 | Herrington et al. | 340/710 |
| 4,655,673 A | 4/1987 | Hawkes | 414/730 |
| 4,661,032 A | 4/1987 | Arai | 414/5 |
| 4,670,851 A | 6/1987 | Murakami et al. | 364/518 |
| 4,680,519 A | 7/1987 | Chand et al. | 318/568 |
| 4,703,443 A | 10/1987 | Moriyasu | 364/559 |
| 4,729,098 A | 3/1988 | Cline et al. | 364/414 |

(Continued)

FOREIGN PATENT DOCUMENTS

EP    0915434 A2    5/1999

(Continued)

OTHER PUBLICATIONS

Adachi, "Touch and Trace on the Free-Form Surface of Virtual Object", Proceedings of IEEE Virtual Reality Annual International Symposium, Sep. 18-22, 1993, Seattle WA, pp. 162-168.

(Continued)

*Primary Examiner*—Matthew C. Bella
*Assistant Examiner*—Wesner Sajous
(74) *Attorney, Agent, or Firm*—Goodwin Procter LLP

(57) ABSTRACT

The invention provides texture mapping techniques that facilitate interactive painting of a three-dimensional virtual surface by a user in object space, without requiring global parameterization. The texture mapping techniques feature rendering texture for a given virtual object using a plurality of composite textures, each formed by blending collapsible texture layers. Texture coordinates in texture space are derived using information determined at the time of surface mesh generation. The invention features dynamic texture allocation and deallocation, allowing a user to interactively modify the shape of a painted, three-dimensional model. Finally, the invention features an architecture for combined graphical rendering and haptic rendering of a virtual object, allowing a user to experience force feedback during the painting of the object in object space.

11 Claims, 28 Drawing Sheets
(10 of 28 Drawing Sheet(s) Filed in Color)

U.S. PATENT DOCUMENTS

| | | | | |
|---|---|---|---|---|
| 4,769,763 A | 9/1988 | Trieb et al. | ............... | 364/559 |
| 4,791,934 A | 12/1988 | Brunnett | ............... | 128/653 |
| 4,819,195 A | 4/1989 | Bell et al. | ............... | 364/571.1 |
| 4,839,838 A | 6/1989 | LaBiche et al. | ............... | 364/709.1 |
| 4,853,874 A | 8/1989 | Iwamoto et al. | ............... | 364/513 |
| 4,907,973 A | 3/1990 | Hon | ............... | 434/262 |
| 4,942,538 A | 7/1990 | Yuan et al. | ............... | 364/513 |
| 4,945,305 A | 7/1990 | Blood | ............... | 324/207.2 |
| 4,945,501 A | 7/1990 | Bell et al. | ............... | 364/571.1 |
| 4,961,138 A | 10/1990 | Gorniak | ............... | 364/200 |
| 4,982,504 A | 1/1991 | Söderberg et al. | ............... | 33/502 |
| 4,988,981 A | 1/1991 | Zimmerman et al. | ............... | 340/709 |
| 5,040,306 A | 8/1991 | McMurtry et al. | ............... | 33/556 |
| 5,053,975 A | 10/1991 | Tsuchihashi et al. | ............... | 364/513 |
| 5,072,361 A | 12/1991 | Davis et al. | ............... | 364/167 |
| 5,088,046 A | 2/1992 | McMurtry | ............... | 364/474 |
| 5,088,055 A | 2/1992 | Oyama | ............... | 364/560 |
| 5,105,367 A | 4/1992 | Tsuchihashi et al. | ............... | 395/99 |
| 5,131,844 A | 7/1992 | Marinaccio et al. | ............... | 433/72 |
| 5,185,561 A | 2/1993 | Good et al. | ............... | 318/432 |
| 5,189,806 A | 3/1993 | McMurtry et al. | ............... | 33/503 |
| 5,204,824 A | 4/1993 | Fujimaki | ............... | 364/474 |
| 5,237,647 A | 8/1993 | Roberts et al. | ............... | 345/419 |
| 5,255,211 A | 10/1993 | Redmond | ............... | 364/578 |
| 5,333,257 A | 7/1994 | Merrill et al. | ............... | 345/467 |
| 5,354,162 A | 10/1994 | Burdea et al. | ............... | 414/5 |
| 5,389,865 A | 2/1995 | Jacobus et al. | ............... | 318/568.1 |
| 5,396,265 A | 3/1995 | Ulrich et al. | ............... | 345/158 |
| 5,446,834 A | 8/1995 | Deering | ............... | 345/427 |
| 5,459,382 A | 10/1995 | Jacobus et al. | ............... | 318/568.1 |
| 5,482,051 A | 1/1996 | Reddy et al. | ............... | 128/733 |
| 5,497,452 A | 3/1996 | Shimizu et al. | ............... | 395/120 |
| 5,515,078 A | 5/1996 | Greschler et al. | ............... | 345/156 |
| 5,555,894 A | 9/1996 | Doyama et al. | ............... | 128/782 |
| 5,587,937 A | 12/1996 | Massie et al. | ............... | 364/578 |
| 5,623,642 A | 4/1997 | Katz et al. | ............... | 395/500 |
| 5,625,576 A | 4/1997 | Massie et al. | ............... | 364/578 |
| 5,629,594 A | 5/1997 | Jacobus et al. | ............... | 318/568.1 |
| 5,659,493 A | 8/1997 | Kiridena et al. | ............... | 703/2 |
| 5,666,138 A | 9/1997 | Culver | ............... | 345/161 |
| 5,687,304 A * | 11/1997 | Kiss | ............... | 345/419 |
| 5,691,898 A | 11/1997 | Rosenberg et al. | ............... | 364/190 |
| 5,694,013 A | 12/1997 | Stewart et al. | ............... | 318/561 |
| 5,721,566 A | 2/1998 | Rosenberg et al. | ............... | 345/161 |
| 5,724,264 A | 3/1998 | Rosenberg et al. | ............... | 364/559 |
| 5,731,804 A | 3/1998 | Rosenberg | ............... | 345/156 |
| 5,734,373 A | 3/1998 | Rosenberg et al. | ............... | 345/161 |
| 5,737,505 A | 4/1998 | Shaw et al. | ............... | 395/119 |
| 5,739,811 A | 4/1998 | Rosenberg et al. | ............... | 345/161 |
| 5,751,289 A | 5/1998 | Myers | ............... | 345/419 |
| 5,769,640 A | 6/1998 | Jacobus et al. | ............... | 434/262 |
| 5,774,130 A | 6/1998 | Horikawa et al. | ............... | 345/441 |
| 5,784,542 A | 7/1998 | Ohm et al. | ............... | 395/95 |
| 5,790,108 A | 8/1998 | Salcudean et al. | ............... | 345/161 |
| 5,798,752 A | 8/1998 | Buxton et al. | ............... | 345/146 |
| 5,800,177 A | 9/1998 | Gillio | ............... | 434/262 |
| 5,800,178 A | 9/1998 | Gillio | ............... | 434/262 |
| 5,800,179 A | 9/1998 | Bailey | ............... | 434/262 |
| 5,802,353 A | 9/1998 | Avila et al. | ............... | 395/500 |
| 5,803,738 A | 9/1998 | Latham | ............... | 434/29 |
| 5,805,140 A | 9/1998 | Rosenberg et al. | ............... | 345/161 |
| 5,821,920 A | 10/1998 | Rosenberg et al. | ............... | 345/156 |
| 5,825,308 A | 10/1998 | Rosenberg | ............... | 341/20 |
| 5,828,197 A | 10/1998 | Martin et al. | ............... | 318/567 |
| 5,831,408 A | 11/1998 | Jacobus et al. | ............... | 318/568.1 |
| 5,844,392 A | 12/1998 | Peurach et al. | ............... | 318/568.2 |
| 5,847,956 A | 12/1998 | Bronfeld et al. | ............... | 700/98 |
| 5,859,934 A | 1/1999 | Green | ............... | 382/296 |
| 5,872,438 A | 2/1999 | Roston | ............... | 318/568.11 |
| 5,873,106 A | 2/1999 | Roston | ............... | 715/506 |
| 5,882,206 A | 3/1999 | Gillio | ............... | 434/262 |
| 5,889,670 A | 3/1999 | Schuler et al. | ............... | 364/186 |
| 5,898,599 A | 4/1999 | Massie et al. | ............... | 345/161 |
| 5,907,487 A | 5/1999 | Rosenberg et al. | ............... | 364/190 |
| 5,913,727 A | 6/1999 | Ahdoot | ............... | 463/39 |
| 5,956,484 A | 9/1999 | Rosenberg et al. | ............... | 395/200.3 |
| 5,963,212 A | 10/1999 | Bakalash | ............... | 345/424 |
| 5,973,678 A | 10/1999 | Stewart et al. | ............... | 345/184 |
| 5,988,862 A | 11/1999 | Kacyra et al. | ............... | 703/6 |
| 6,084,587 A | 7/2000 | Tarr et al. | ............... | 345/419 |
| 6,111,577 A | 8/2000 | Zilles et al. | ............... | 345/701 |
| 6,191,796 B1 | 2/2001 | Tarr | ............... | 345/433 |
| 6,211,848 B1 | 4/2001 | Plesniak et al. | ............... | 345/156 |
| 6,226,003 B1 | 5/2001 | Akeley | ............... | 345/419 |
| 6,308,144 B1 | 10/2001 | Bronfeld et al. | ............... | 703/2 |
| 6,337,678 B1 | 1/2002 | Fish | ............... | 345/156 |
| 6,342,880 B1 | 1/2002 | Rosenberg et al. | ............... | 345/161 |
| 6,369,834 B1 | 4/2002 | Zilles et al. | ............... | 345/701 |
| 6,405,158 B1 | 6/2002 | Massie et al. | ............... | 703/6 |
| 6,417,638 B1 | 7/2002 | Guy et al. | ............... | 318/560 |
| 6,421,048 B1 | 7/2002 | Shih et al. | ............... | 345/419 |
| 6,552,722 B1 | 4/2003 | Shih et al. | ............... | 345/19 |
| 6,608,631 B1 | 8/2003 | Milliron | ............... | 345/647 |
| 6,671,651 B1 | 12/2003 | Goodwin et al. | ............... | 702/152 |
| 6,792,398 B1 | 9/2004 | Handley et al. | ............... | 703/2 |
| 6,831,640 B1 | 12/2004 | Shih et al. | ............... | 345/419 |
| 6,853,965 B1 | 2/2005 | Massie et al. | ............... | 703/6 |
| 6,867,770 B1 | 3/2005 | Payne | ............... | 345/643 |
| 6,879,315 B1 | 4/2005 | Guy et al. | ............... | 345/156 |
| 2002/0089500 A1 | 7/2002 | Jennings et al. | ............... | 345/420 |
| 2003/0048277 A1* | 3/2003 | Maillot et al. | ............... | 345/582 |
| 2003/0234781 A1* | 12/2003 | Laidlaw et al. | ............... | 345/419 |
| 2004/0233196 A1* | 11/2004 | Hertzmann | ............... | 345/441 |
| 2005/0001831 A1 | 1/2005 | Shih et al. | ............... | 345/419 |
| 2005/0062738 A1 | 3/2005 | Handley et al. | ............... | 345/419 |
| 2005/0093821 A1 | 5/2005 | Massie et al. | ............... | 345/161 |
| 2005/0128210 A1 | 6/2005 | Berger | ............... | 345/582 |
| 2005/0128211 A1 | 6/2005 | Berger et al. | ............... | 345/582 |

FOREIGN PATENT DOCUMENTS

| | | |
|---|---|---|
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |
| WO | WO 99/10872 | 3/1999 |

OTHER PUBLICATIONS

Agrawala et al., "3D Painting on Scanned Surfaces", Standford University, 1995, pp. 145-150.

Barr, "Global and Local Deformations of Solid Primitives", Computer Graphics; vol. 18, No. 3, pp. 21-30 (Jul., 1984).

Blinn, "Simulation of Wrinkled Surfaces," Computer Graphics, vol. 12-3, Aug. 1978, pp. 286-292.

Brooks et al., "Project GROPE—Haptic Displays for Scientific Visualization," Computer Graphics, vol. 24, No. 4, Aug. 1990, pp. 177-185.

Decaudin, "Geometric Deformation by Merging a 3D-Object with a Simple Shape," Graphics Interface '96 Proceedings (Toronto, Canada), 6 pgs. (May 21-24, 1996).

Dworkin et al., "A New Model for Efficient Dynamic", Fourth Eurographics Animation and Simulation Workshop Proceedings Eurographics Technical Report Series, ISSN 1017-4656, Sep. 4-5, 1993, pp. 135-147.

Elhajj et al., "Supermedia-Enhanced Internet-Based Telerobotics," Proceedings of the IEEE, vol. 91, No. 3, pp. 396-421 (Mar. 2003).

Foskey, M. et al., "ArtNova: Touch-Enabled 3D Model Design," IEEE Virtual Reality 2002, pp. 119-126 (Mar. 2002).

Fuentes et al., "The Virtual Tool Approach to Dextrous Telemanipulation," Proceedings of the 1996 IEEE International Conference on Robotics and Automation (Minneapolis, MN), pp. 1700-1705 (Apr. 1996).

Galyean, "Sculpting: An Interactive Volumetric Modeling Technique," Computer Graphics (SIGGRAPH '91 Las Vegas), vol. 25, No. 4, pp. 267-274 (Jul. 1991).

Hashimoto et al., "Dynamic Force Simulator for Force Feedback Human-Machine Interaction", IEEE, Sep. 1993, pp. 209-215.

Hirata et al., "3-Dimensional Interface Device for Virtual Work Space," Proceedings of the 1992 IEEE, Jul. 7-10, 1992, pp. 889-896.

Hirota et al., "Providing Force Feedback in Virtual Environments", IEEE, Sep. 1995, pp. 22-30.

Hirota et al., "Development of Surface Display," Proceedings of the Virtual Reality Annual International Symposium (Seattle), pp. 256-262 (Sep. 18-23, 1993).

Immersion Corporation, "Laparoscopic Impulse Engine□: A New Force Feedback Surgical Simulation Tool", Immersion Corporation, 1995. http://www.immerse.com/wwwpages/lapIEpg.htm.

Immersion Corporation, "The Impulse Engine□", 1 page, Immersion Corporation, 1996.

Immersion Corporation, "Virtual Laparoscopic Interface", Immersion Corporation, 1995, 1 pg.

Ishii et al., "A 3D Interface Device with Force Feedback: A Virtual Work Space for Pick-and-Place Tasks", IEEE, Sep. 1993, pp. 331-335.

Iwata,"Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.

Kotoku et al., "A Force Display Algorithm for Virtual Environments," SICE, pp. 347-355, 1992.

Luo et al., "Networked Intelligent Robots Through the Internet: Issues and Opportunities," Proceedings of the IEEE, vol. 91, No. 3, pp. 371-382 (Mar. 2003).

Marcus et al., "EXOS Research on Master Controllers for Robotic Devices," Fifth Annual Workshop on Space Operations Applications and Research (SOAR '91) pp. 238-245, Jul. 1991.

Massie, "Design of a Three Degree of Freedom Force-Reflecting Haptic Interface", Massachusetts Institute of Technology; Bachelor of Science in Electrical Science and Engineering Thesis, May, 1993, pp. 1-38.

Massie, "Initial Haptic Explorations with the Phantom: Virtual Touch Through Point Interaction", Massachusetts Institute of Technology Master of Science Thesis, Feb., 1996, pp. 1-49. (not admitted as prior art).

McAffee et al, "Teleoperator Subsystem/Telerobot Demonstrator," Force Reflecting Hand Controller Equipment Manual, Jet Propulsion Laboratory, Jan. 1988.

Millman et al., "A System for the Implementation and Kinesthetic Display of Virtual Environments," Telemanipulator Technology, Proceedings of 1992 SPIE, vol. 1833, pp. 49-56.

Minsky et al., "Feeling and Seeing: Issues in Force Display," Computer Graphics, vol. 24, No. 2, Mar. 1990, pp. 235-270.

Minsky, "Computational Haptics: The Sandpaper System for Synthesizing Texture for a Force-Feedback Display," Massachusetts Institute of Technology Ph.D. Thesis, Jun., 1995, pp. 1-217.

Morgenbesser, "Force Shading for Shape Perception in Haptic Virtual Environments", Massachusetts Institute of Technology Master of Engineering Thesis, Sep., 1995, pp. 1-77.

Oboe, "Force-Reflecting Teleoperation Over the Internet: The JBIT Project," Proceedings of the IEEE, vol. 91, No. 3, pp. 449-462 (Mar. 2003).

Payne et al., "Distance Field Manipulation of Surface Models," IEEE Computer Graphics & Applications, pp. 65-71 (Jan. 1992).

Porter et al., "Compositing Digital Images", Computer Graphics, vol. 18. No. 3, Jul. 1984, pp. 253-259.

Safaric et al., "Control of Robot Arm with Virtual Environment via the Internet," Proceedings of the IEEE, vol. 91, No. 3, pp. 422-429 (Mar. 2003).

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

SensAble Technologies, Inc., "Phantom Haptic Interface," 1996, Cambridge, MA (6 pgs).

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Swarup, "Haptic Interaction with Deformable Objects Using Real-Time Dynamic Simulation", Massachusetts Institute of Technology, Sep. 1995, pp. 1-83.

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

Terzopoulos et al.; "Elastically Deformable Models"; Computer Graphics, vol. 21, No. 4, pp. 205-214 (Jul., 1987).

Tyson, Howstuffworks, "How AGP Work", http://computer.howstuffworks.com/agp.htm/printalbe, printed Jul. 15, 2003.

University of Michigan Virtual Reality Laboratory, "Revival of the Virtual Lathe," http://www-vrl.umich.edu/sel_prj/lathe/, (Dec. 20, 2002).

Wang et al., "Volume Sculpting", 1995 Symposium on Interactive 3D Graphics, Monterey, California, pp. 151-156.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburg, Pennsylvania, 1995, pp. 146-151.

Zilles, "Haptic Rendering with the Toolhandle Haptic Interface," Massachusetts Institute of Technology Master of Science Thesis, May 1995, pp. 1-46.

US 5,903,456, 05/1999, Schena et al. (withdrawn)

* cited by examiner

Main Texture

Main Texture + Scratch Textures

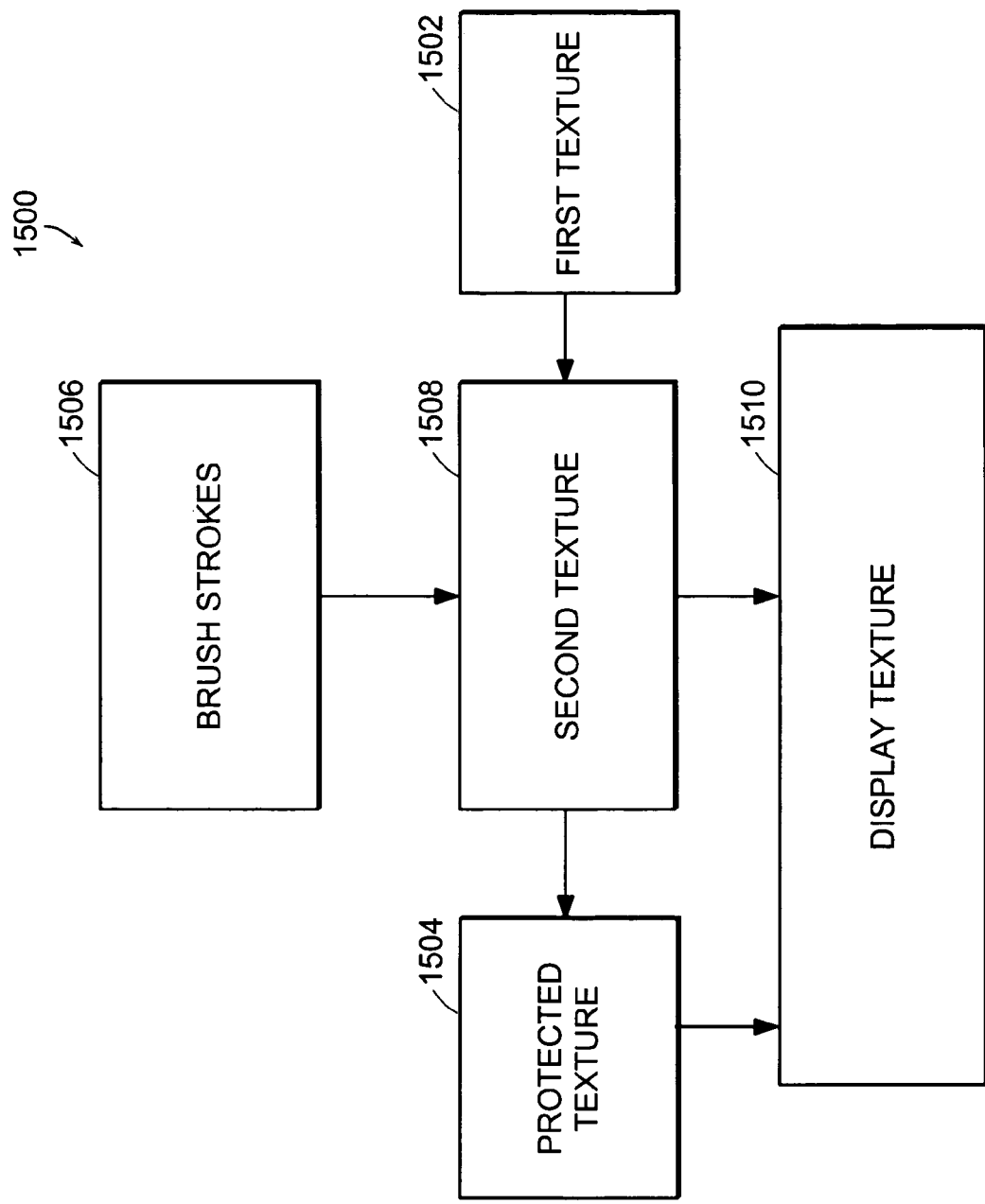

APPARATUS AND METHODS FOR TEXTURE MAPPING

RELATED APPLICATIONS

This application is related to the commonly-owned U.S. patent application 10/697,174 entitled, "Apparatus and Methods for Stenciling an Image," by Levene et al., filed under on even date herewith, the text of which is hereby incorporated by reference in its entirety.

FIELD OF THE INVENTION

This invention relates generally to graphical rendering. More particularly, in certain embodiments, the invention relates to texture mapping techniques for the graphical rendering of a virtual object.

BACKGROUND OF THE INVENTION

Certain computer graphics applications graphically render the surface of a three-dimensional virtual object. The surface of a three-dimensional virtual object is generally represented as a mesh of polygonal surface elements, for example, triangles. Attributes, such as color intensity, are assigned to surface elements of the virtual object, which are then displayed to the user.

The resolution of the surface mesh is typically chosen according to the three-dimensional complexity of the object. For example, rendering a virtual object having a complex geometry may require a tight mesh of many small surface elements, whereas rendering a virtual object of simpler shape may be performed with a looser mesh of fewer, larger surface elements.

It is typically not possible to achieve sufficient realism by assigning color values to vertices of each surface element, particularly if the surface elements are large. This problem may be overcome by representing three-dimensional surface properties of the object using a texture in two-dimensional space. Texture mapping permits improved resolution of surface properties, such as color values, within each surface element, and allows certain operations to be performed on the three-dimensional object as if it were flat.

Mapping methods are used to relate points on the surface of a three-dimensional virtual object to corresponding points of a two-dimensional surface. For example, mapping methods can be used to relate points on the surface of a three-dimensional sphere, such as the Earth, to corresponding points of a two-dimensional map. Certain graphics applications perform texture mapping for a three-dimensional virtual object by establishing a global parameterization that links every surface element in the three-dimensional object space to an element in two-dimensional texture space. The mapping process may not be automatic and may require manual input from the user. A goal of these mapping schemes is to produce a coherent two-dimensional texture whose elements are arranged in such a way that the distortion of the object surface is acceptably low. For many complex virtual objects, this poses a problem that is either computationally difficult or intractable.

Furthermore, current graphics applications require a user to paint the surface of a virtual object in two-dimensional texture space before applying the texture on the virtual object in three-dimensional object space. This results in a less interactive, less intuitive experience for the user.

Moreover, current methods do not allow a user to modify the shape of the object after its surface has been painted without losing surface data from unmodified portions of the object. This is due, in part, to the need to re-mesh and re-parameterize the entire model following any modification of the underlying three-dimensional model.

A method of texture painting has recently been introduced to allow texture mapping without global parameterization. M. Foskey et al., "ArtNova: Touch-Enabled 3D Model Design," *IEEE Virtual Reality* 2002, pp. 119–126, (March 2002).

However, there remains a need for mapping methods that allow a user to modify the shape of an object after its surface has been painted, without losing the surface data from unmodified portions of the object. There also exists a need for a more efficient graphical rendering method that is able to support the rendering of complex virtual objects, while still allowing a user to interactively paint directly onto the object in object space. Furthermore, there is a need for a method of blending textures while maintaining the interactivity of painting, without creating graphical artifacts.

SUMMARY OF THE INVENTION

The invention provides improved methods of graphically rendering virtual objects. More specifically, the invention provides improved texture allocation and texture rendering techniques for graphically representing the surface of a three-dimensional virtual object.

The improved methods allow a user to paint directly onto the surface of a three-dimensional virtual object. The methods also allow a user to interactively modify the shape of a painted, three-dimensional object without losing surface data from unmodified portions of the model. For example, the improved methods permit a user to paint an object, then carve portions of the object without losing the painted surface data from unmodified portions of the model. The improved methods also permit a user to easily switch back and forth between a painting mode and a sculpting mode, without having to reallocate texture for unmodified portions of the object.

Additionally, the invention provides techniques for blending a brush stroke into a surface texture without creating artifacts in the overlapping segments of the stroke, and without diminishing the interactivity of the user's painting experience.

Furthermore, the invention features improved methods for the combined graphical and haptic rendering of a virtual object, thereby permitting a user to experience force feedback via a haptic interface device during the painting of the object in object space. In this way, a user can "feel" the virtual object as the user paints its surface while, at the same time, the user observes a display of the object in object space.

Texture mapping methods of the invention include texture allocation methods and texture rendering methods. Texture allocation refers to the process of allocating elements in texture space to corresponding surface elements in object space. Texture rendering refers to the process by which data in the texture space is sent to a graphics card and/or graphics application for display. Texture rendering also involves sending information to the graphics application that allows the application to correctly relate the texture data to corresponding portions of the surface of the virtual object. Texture rendering methods of the invention are able to interface with any commercially-available standard for three-dimensional rendering and/or three-dimensional hardware acceleration, including cross-platform standards.

In one embodiment, the invention provides an improved method for graphically rendering a virtual object by using information produced during mesh generation. In the process of generating a surface mesh for a voxel-based virtual object, an index is produced for each resulting jack, where a jack is a surface-containing voxel, and a voxel is a volumetric element in object space. Each jack contains a certain configuration of surface elements. There are a finite number of possible configurations of surface elements within each jack; and the number of possible configurations depends on the mesh generation scheme employed. The index for each jack corresponds to one of the finite number of surface element configurations. A first lookup table is created by determining a local configuration of texture elements for each of the known set of surface element configurations. The first lookup table is preferably computed prior to object rendering. Thus, graphical rendering of a given virtual object proceeds by using the indices for the jacks of the virtual object to generate coordinates of texture elements in texture space corresponding to the surface elements of the virtual object.

Thus, in one embodiment, the invention provides a method of graphically rendering a virtual object including the steps of: (1) using an index corresponding to each of a plurality of jacks of a voxel-based virtual object to identify texture elements to which surface elements of the virtual object are mapped; and (2) generating texture coordinates in texture space for each of the identified texture elements. The index may be, for example, a marching cubes index, derived from an implementation of a marching cubes algorithm that is used to generate a surface mesh for the virtual object. Alternatively, the index may be, for example, a marching tetrahedra index, derived from an implementation of a marching tetrahedra algorithm used to generate a surface mesh for the virtual object.

It is found that dividing the surface of a virtual object into texture regions may overcome hardware limitations in rendering complex virtual objects. Thus, in one embodiment, the texture space in the graphical rendering method summarized above includes a plurality of texture regions. Moreover, in addition to steps (1) and (2) above, the rendering method may further include the steps of: (3) binding to a graphics application a blended texture corresponding to one of the plurality of texture regions; and (4) transmitting to the graphics application the texture coordinates for each of a plurality of surface elements associated with the blended texture. The blended texture may be a contiguous texture formed by blending together a plurality of texture layers, as discussed in more detail hereinbelow.

The index produced for each jack as a result of the mesh generation procedure can be used to create any number of lookup tables. In one embodiment, the graphical rendering method includes creating two lookup tables, using a first lookup table to determine to which of a plurality of texture elements a given surface element is mapped, and/or using a second lookup table to determine to which of a plurality of positions within a texture element a given surface element is mapped. For example, where either zero, one, or two triangular surface elements in object space are mapped to a quadrilateral texture element in texture space, a first lookup table is used to determine to which quadrilateral a given triangle is mapped, and the second lookup table is used to determine to which of two positions within the quadrilateral the triangle is mapped. More lookup tables may be used in more complex embodiments, for example, where all of the surface elements of a given jack are mapped to a single texture element.

The invention also includes methods of dynamic texture allocation and deallocation, allowing a user to interactively modify the shape of a painted, three-dimensional model, without losing texture data associated with unmodified portions of the object. Thus, the invention provides a method of mapping texture onto a virtual object that includes: allocating texture for at least one newly-created jack of a virtual object following an object modification; and/or de-allocating texture in the texture space for at least one newly-eliminated jack of the virtual object following an object modification.

In one embodiment, the method proceeds by stepping through contiguous blocks of jacks of the model in render order to determine whether texture allocation is needed therein, and by keeping texture corresponding to a given jack block together within the same texture region. This dynamic allocation method provides improved efficiency, since new texture is only created for the modified jacks, and since there is no global parameterization required. Advantages are achieved by allocating texture in render order and by keeping texture corresponding to a given jack block together within the same texture region. This promotes efficient binding and results in a more efficient texture rendering process. In one embodiment, texture is allocated so as to minimize the number of texture binds required during rendering.

The invention also provides for the compact storage of texture information for a virtual object. Since many texture elements may contain a uniform value, it is efficient to store this information as a single value, instead of storing values for all texels of every texture element. It is not necessary to store a full contiguous texture for a given texture region, since the user does not need to see the texture space at any time, as all edits may be performed by the user in object space. Accordingly, the invention provides a method of creating a blended texture for use in the rendering of a virtual object, the method including the step of blending two or more texture layers, where at least one of the texture layers is a grid of pointers indicating at least two of: (i) uniform texture elements, (ii) nonuniform texture elements, and (iii) the location of the nearest free texture element in the grid.

A blended texture may be created by combining scratch textures, stencil textures, and/or paint textures associated with one or more brush strokes. A scratch texture indicates one or more intensity values of pixels associated with each brush stroke, and a paint texture indicates one or more color values associated with each brush stroke.

The methods of blending texture presented herein are compatible with a method of stenciling in which a user may specify a maximum amount by which selected portions of an image are allowed to change over the course of a series of brush strokes. A first type of stencil texture indicates a level of protection to apply to a given region of an image, and a second type of stencil texture contains brush strokes that are accumulated and are modified according to the protection levels of the first type of stencil texture prior to blending into the image.

Methods of the invention include blending texture layers of at least two of the three types listed above—scratch texture layers, paint texture layers, and stencil texture layers—in the order in which the brush strokes are performed. Enhanced interactivity is achieved, since texture data is blended into the image pixel-by-pixel in discrete time slices, without interrupting the user's application of brush strokes. Additional model complexity can be handled, since texture layers are blended into composite textures for only those texture regions affected by the brush strokes. Furthermore, one embodiment stores the texture layers in a "collapsed" form that includes both uniform and nonuniform texture elements, and then combines them to form a contiguous blended texture suitable for binding to a graphics application.

By combining the various texture allocation, texture rendering, and texture blending methods disclosed herein, the invention provides a complete graphics application feature that allows a user to paint directly on the surface of a virtual object in object space. Accordingly, the invention provides a method of interactively representing application by a user of at least one brush stroke directly onto a virtual object in object space, the method comprising the steps of: (a) allocating a plurality of texture elements in two-dimensional texture space for a plurality of jacks of a virtual object; (b) graphically rendering the allocated texture in real time as a user applies at least one brush stroke onto the virtual object, wherein rendering includes creating at least one blended texture for binding to a graphics application; and (c) updating the blended textures according to the at least one brush stroke applied by the user, wherein the method involves one or more of the following: (i) using an index corresponding to each of a plurality of jacks of the virtual object to identify texture elements to which surface elements of the virtual object are mapped; (ii) dynamically allocating texture in the texture space; and (iii) blending a set of texture layers corresponding to a first of a plurality of texture regions in the texture space and binding the blended texture to the graphics application during rendering of the first texture region.

Finally, the invention features an architecture for combined graphical rendering and haptic rendering of a virtual object, allowing a user to experience force feedback during the painting of the object in object space.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The patent or application file contains at least one drawing executed in color. Copies of this patent or patent application publication with color drawing(s) will be provided by the U.S. Patent and Trademark Office upon request and payment of the necessary fee.

FIG. 15 is a block diagram featuring a method of blending paint strokes into a texture layer where the method protects one or more selected regions of the image from subsequent editing, according to an illustrative embodiment of the invention.

DETAILED DESCRIPTION

The invention provides improved methods of graphically rendering the surface of a three-dimensional virtual object. The invention relates to a method of texture mapping that allows a user to switch between a paint mode and a sculpt mode without losing data. The method also provides for accurate and efficient rendering without requiring global parameterization.

Texture mapping is a process by which points on the surface of a three-dimensional virtual object are related to points on a two-dimensional surface. Texture mapping allows certain operations to be performed on the three-dimensional object as if it were flat. The three-dimensional virtual object is generally represented in object space, for example, as a system of elements and/or points in a Cartesian (x,y,z) coordinate system. The surface elements of the object are mapped to texture elements in two-dimensional texture space. The texture is then rendered by relating texels, or pixels in texture space, to corresponding points in object space, and displaying them to a user. Additional effects, such as lighting, shadowing, manipulation of orientation and/or size, animation, and other effects, may be performed once the surface of the object is initially rendered.

Because embodiments of the invention allow a user to paint directly on the object in object space, the texture space need not be coherent. There is no need to display the texture space to the user. Accordingly, mapping methods of the invention do not require global UV parameterization.

Figure 1A:
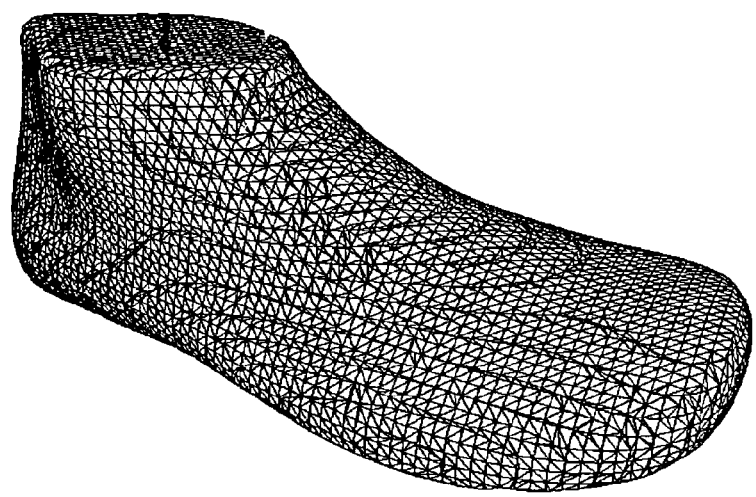
FIG. 1A is schematic diagram illustrating a surface mesh of a three dimensional virtual object, according to an illustrative embodiment of the invention.
Figure 1B:
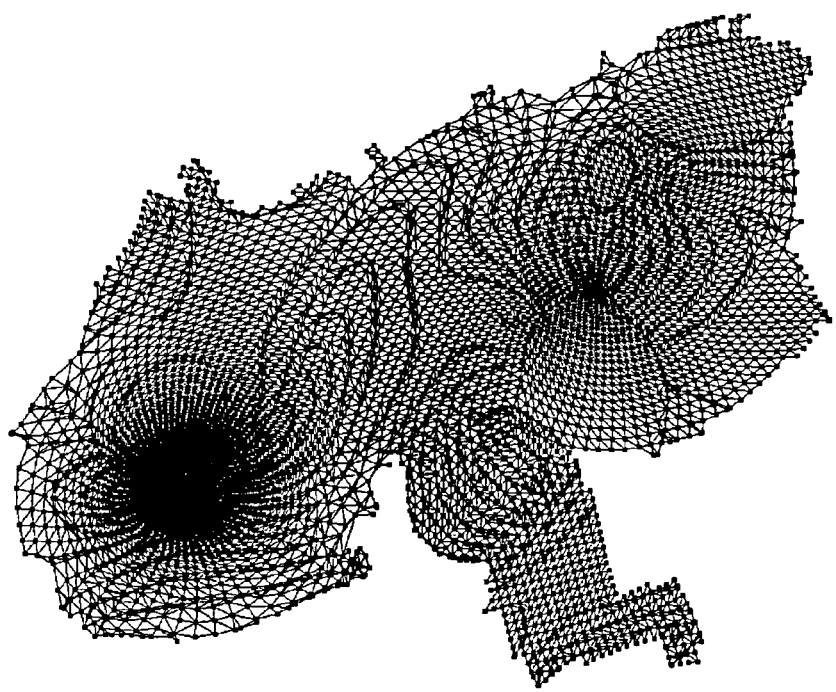
FIG. 1B is a schematic diagram illustrating a flat, coherent texture map of the object of FIG. 1A, produced using global UV parameterization.

FIG. 1A is a schematic diagram 100 illustrating triangular surface elements of a three dimensional virtual object in object space. FIG. 1B shows a flat, coherent, two-dimensional texture map 120 of the object of FIG. 1A, produced using global UV parameterization. The elements of the texture map 120 are shown in texture space in FIG. 1B, and are linked to the surface elements of the virtual object in object space, shown in FIG. 1A. For many complex virtual objects, producing a coherent two-dimensional texture with minimal distortion when mapped to the three-dimensional object is a computationally difficult (or intractable) problem that may require manual input and/or user trial-and-error.

Figure 2A:
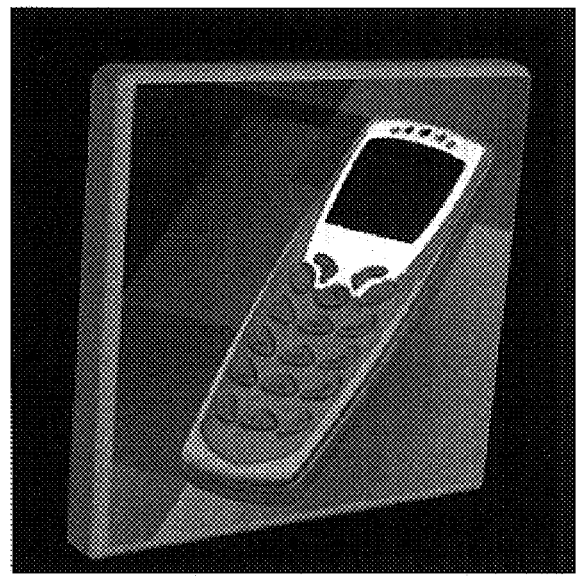
FIG. 2A is a schematic diagram illustrating a three dimensional block with a painted face as viewed in object space, according to an illustrative embodiment of the invention.
Figure 2B:
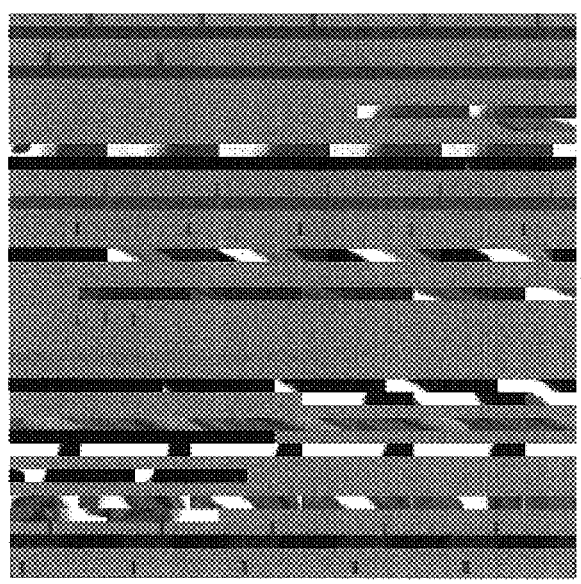
FIG. 2B is a schematic diagram illustrating texture in a two-dimensional texture space that is mapped to the block of FIG. 2A, according to an illustrative embodiment of the invention.

FIG. 2A is a schematic diagram 200 illustrating a three-dimensional virtual object as viewed in object space. The virtual object is a three-dimensional block with one face painted with a two-dimensional image of a cell phone. Instead of generating a global UV parameterization, surface elements of the virtual object are mapped to texture elements in a two-dimensional texture space, as shown in the schematic diagram 220 of FIG. 2B. Methods of the invention, discussed in more detail herein, are used to fill up texture elements allocated to surface elements of the virtual object as a user paints a virtual object in object space. The texture need not be coherent, since the user does not need to view the texture space when painting.

Texture mapping includes texture allocation and texture rendering. Texture allocation refers to the process of allocating elements in texture space to corresponding elements in object space.

Figure 3:
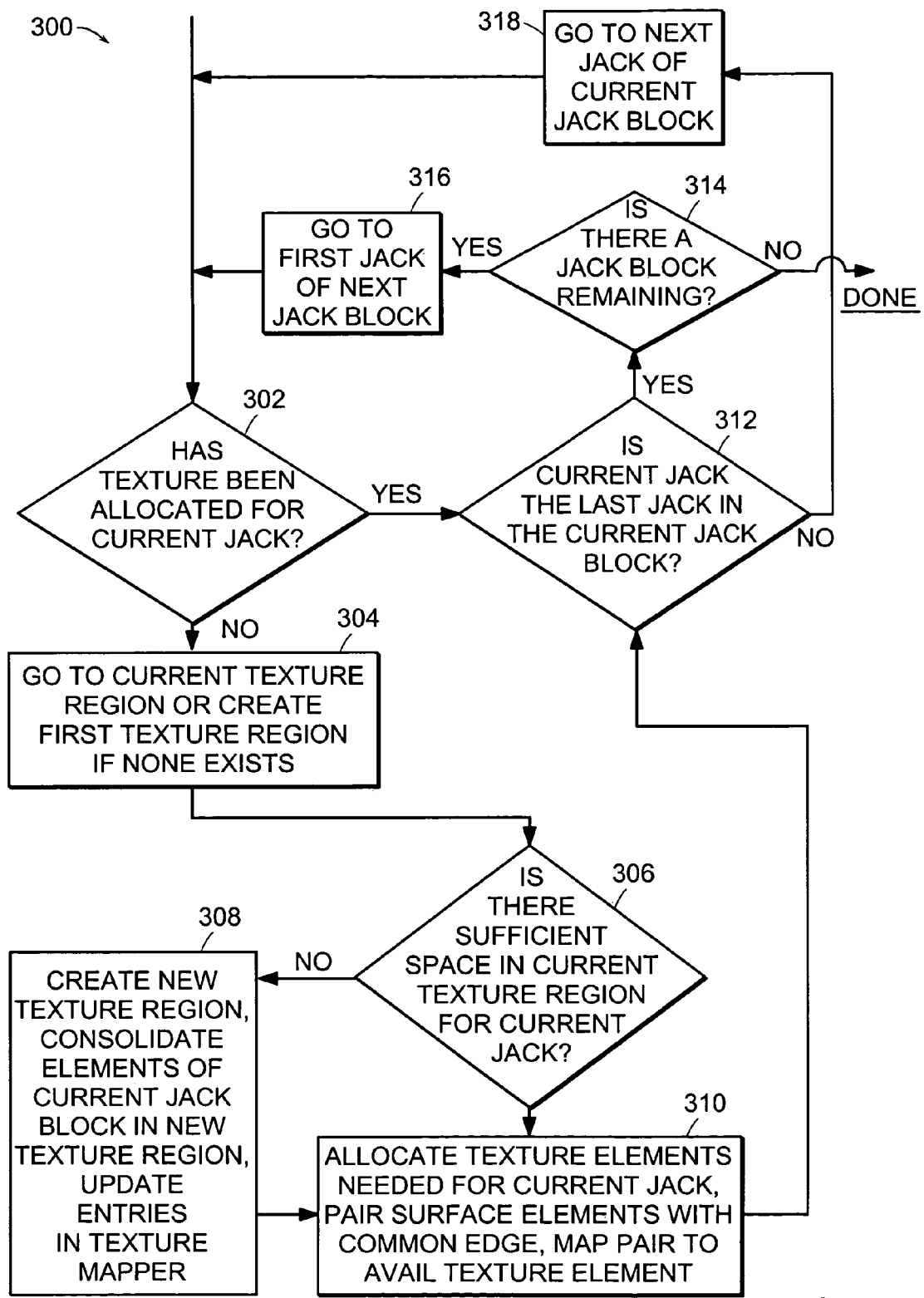
FIG. 3 is a block diagram featuring a method of texture allocation, according to an illustrative embodiment of the invention.

FIG. 3 is a block diagram 300 featuring a method of texture allocation, according to an illustrative embodiment of the invention. The allocation process of FIG. 3 begins when the user enters a paint command, or otherwise indicates she is ready to begin painting or otherwise editing the surface of the virtual object. At this stage, it is possible that no elements in texture space have been allocated to the surface elements of the object. Alternatively, the method in the block diagram 300 of FIG. 3 may be initiated when the user enters a paint command after having sculpted the object, added "clay" to the object, or otherwise modified the shape of the object in a way that creates additional surface. In this case, some texture elements have been allocated to the surface elements of the object, but there may be new surface elements of the object requiring the allocation of texture elements in texture space. If jacks are eliminated as a result of the object edits, texture space is deallocated by freeing the texture elements corresponding to the eliminated jacks.

The method of FIG. 3 proceeds by stepping through jacks in the object space in the order in which the object is rendered. Texture rendering, and rendering order, is discussed in more detail hereinbelow. Texture allocation proceeds from jack to jack in render order by allocating texture elements for the surface elements in the jack.

Figure 4A:
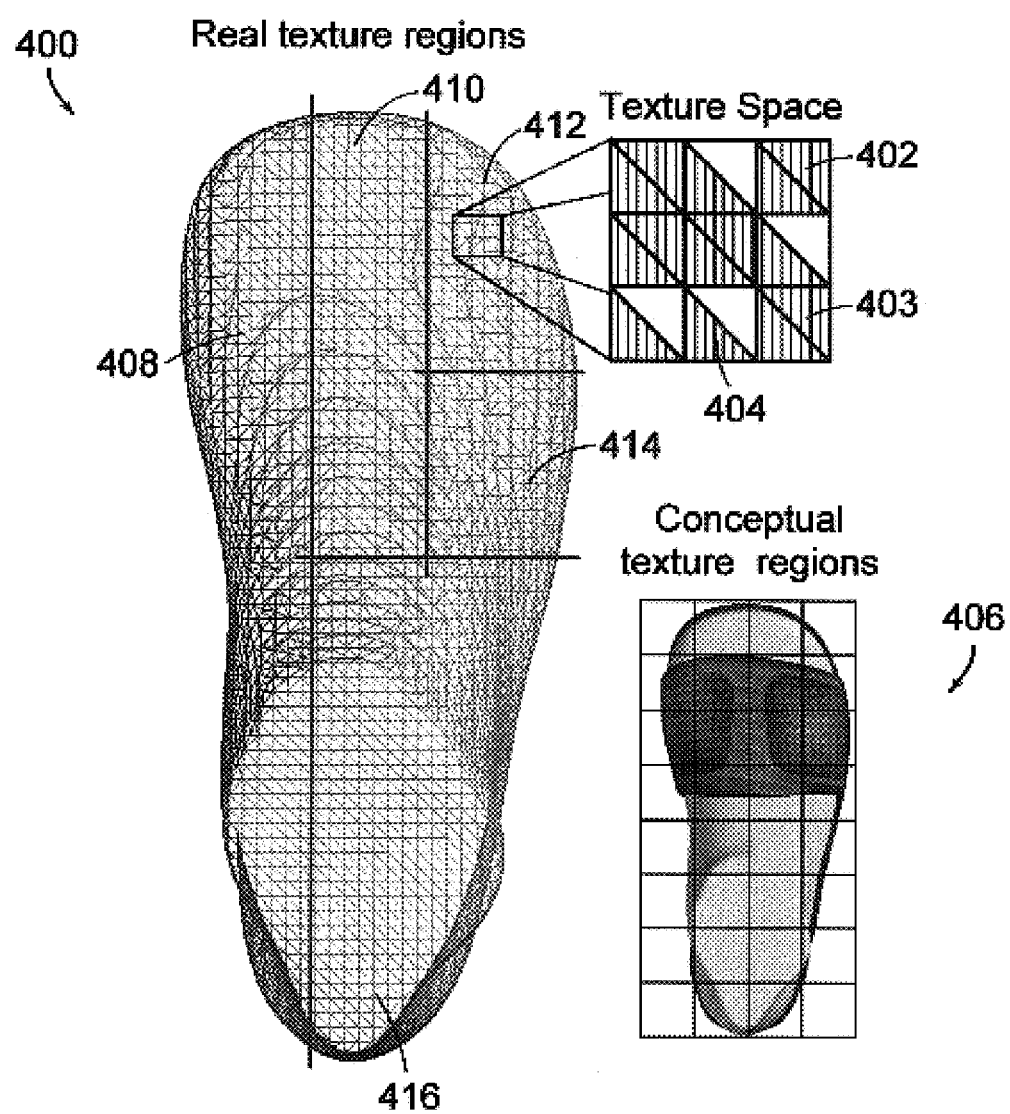
FIG. 4A is a schematic diagram illustrating the partitioning of texture elements associated with a three dimensional virtual object into texture regions in texture space, according to an illustrative embodiment of the invention.

Texture allocation proceeds such that a plurality of texture regions are defined for the virtual object being rendered. The organization of allocated texture into texture regions is important in the rendering methods described herein, since it allows binding and rendering texture from one texture region at the time, providing faster, more efficient rendering of complex virtual objects. FIG. 4A illustrates the partitioning of texture elements—for example, references 402, 403, and 404—associated with a three-dimensional virtual object 400 into texture regions. Although later figures portray texture regions as boxes that divide up the virtual object into neat segments, as seen at reference 406, a texture region is not necessarily so neatly partitioned, since its extent is based on how texture is allocated to the jacks in render order. For example, texture regions may divide up the virtual object roughly into the portions indicated at references 408, 410, 412, 414, and 416.

Figure 4B:
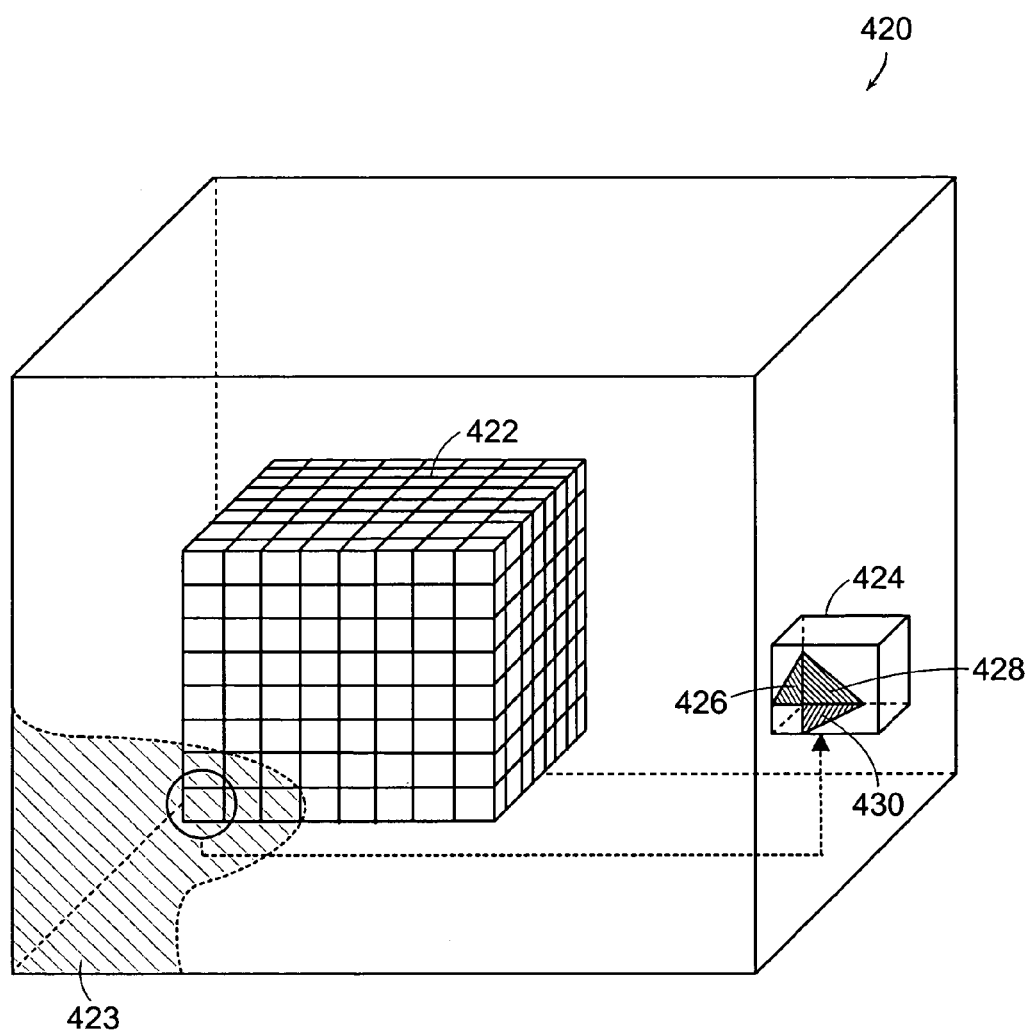
FIG. 4B is a schematic diagram illustrating a volume in object space containing jack blocks, each made up of 512 contiguous voxels, at least one of which is a jack (a surface-containing voxel), where the volume contains surface elements that are mapped to a given texture region in texture space, according to an illustrative embodiment of the invention.

Furthermore, jacks may be organized into jack blocks. For example, a jack block may be an 8×8×8 contiguous block of voxels, although any other number or configuration of voxels may be used. The voxels within a given jack block may or may not include surface-containing voxels (jacks). FIG. 4B illustrates a volume 420 in object space encompassing the jack blocks that contain all the object surface elements that are mapped to a given texture region. One of the jack blocks is shown at reference 422. The surface of the virtual object that intersects the volume 420 is shown at reference 423. The jack block at reference 422 contains 8×8×8 (=512) voxels. A single jack is shown at reference 424. Jack 424 contains three object surface elements 426, 428, 430.

Figure 5:
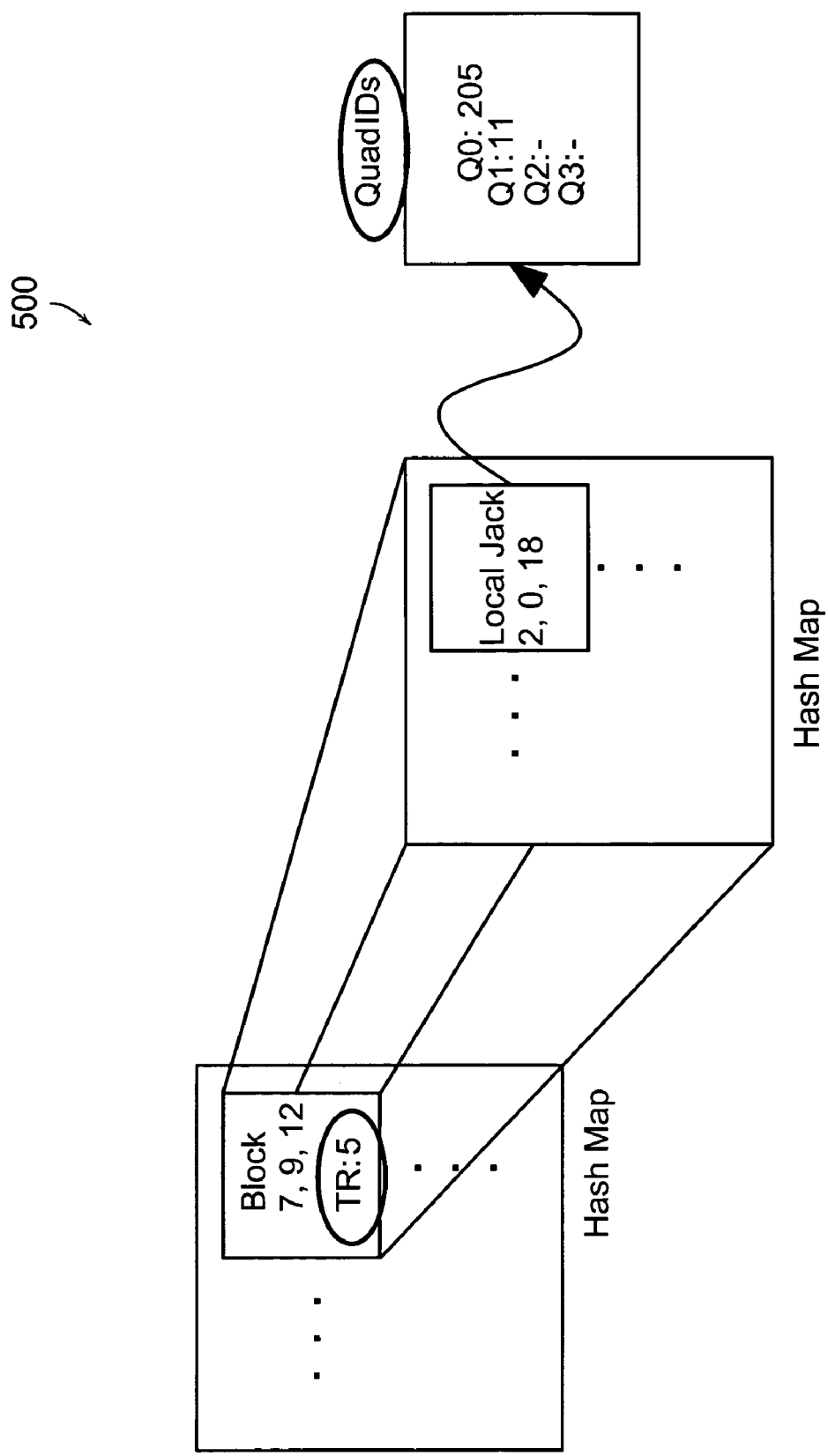
FIG. 5 is a schematic diagram illustrating a hash map of hash maps identifying each texture element within a given texture region, where each texture element is mapped to a jack within a jack block, according to an illustrative embodiment of the invention.
Figure 20:
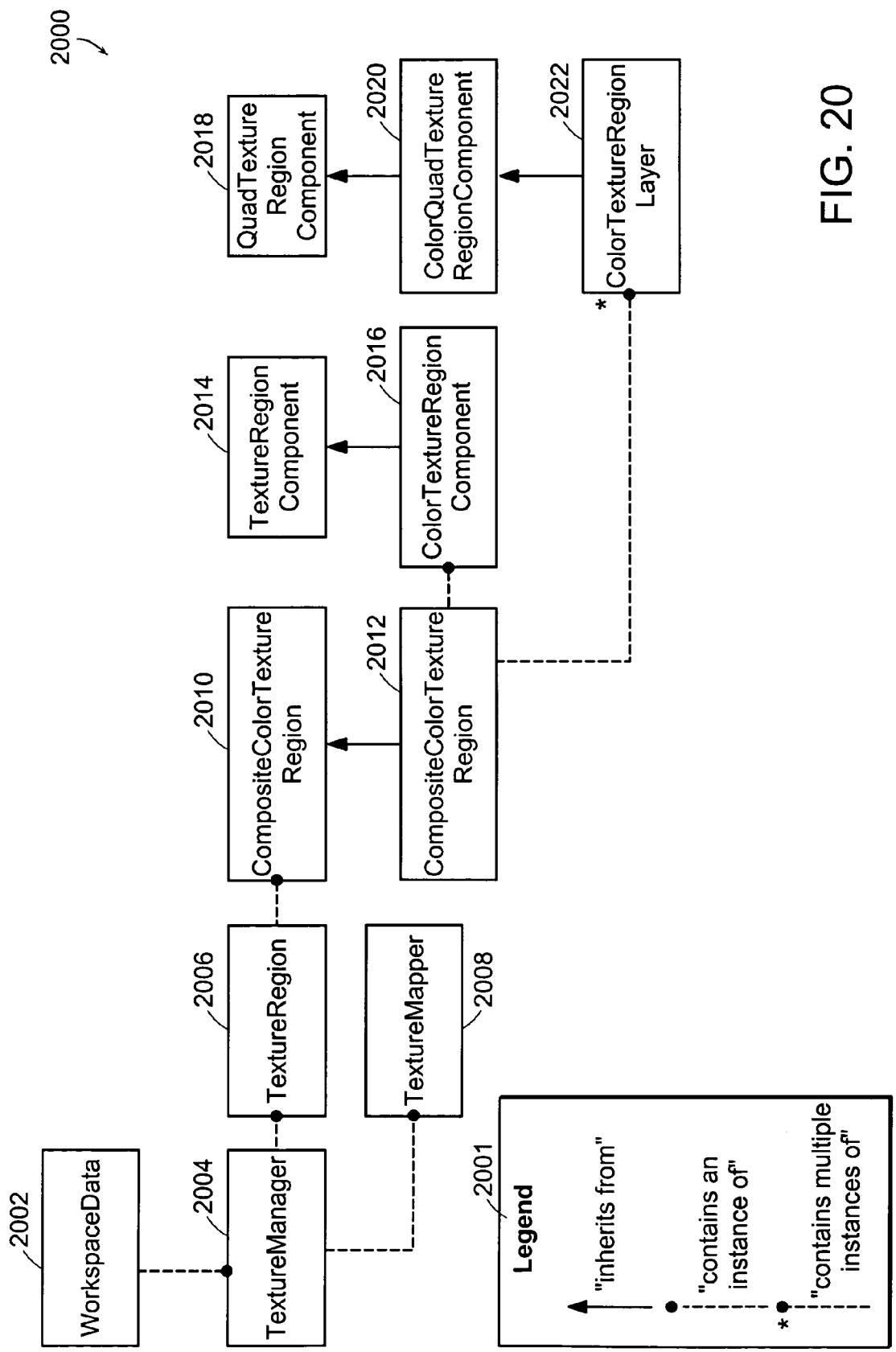
FIG. 20 is a block diagram featuring a computer system architecture for graphically rendering a virtual object, according to an illustrative embodiment of the invention.
Figure 21:
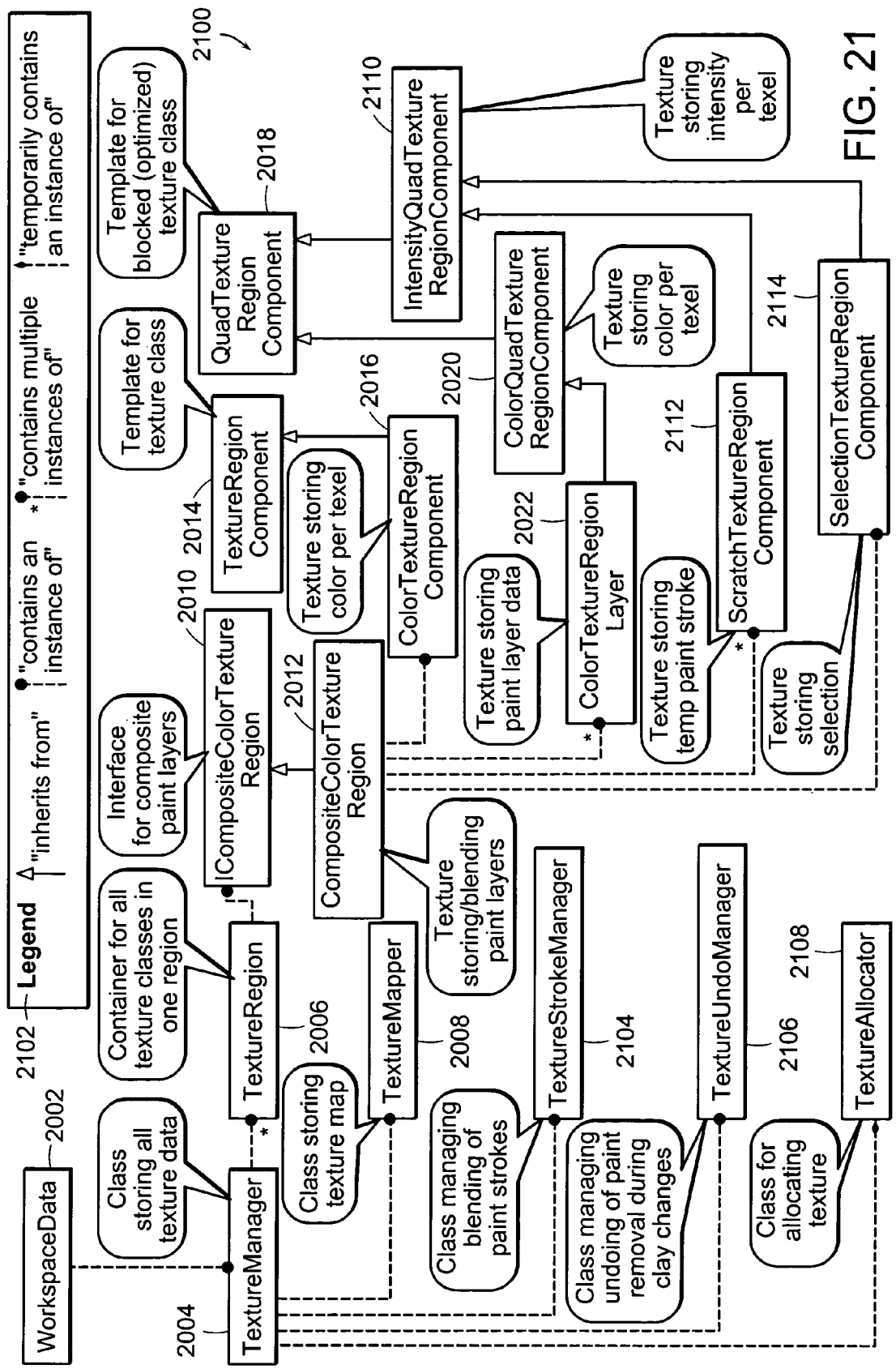
FIG. 21 is a block diagram featuring a computer system architecture for graphically rendering a virtual object, according to an illustrative embodiment of the invention.

The allocation method produces a list, for example, the "Texture Mapper" depicted in the system architecture of FIG. 20 and FIG. 21. The list provides a "map" identifying texture elements corresponding to the jacks of the virtual object. The list may be a hash map identifying each texture element corresponding to surfaces in each of a plurality of jacks. More preferably, the list is a hash map of hash maps identifying each texture element corresponding to surface(s) in each jack of each jack block. The Texture Mapper stores all the texture element identifiers owned by a particular jack. For example, FIG. 5 illustrates a hash map of hash maps 500 identifying each texture element ("Q0, Q1, Q2, Q3"), within a given texture region ("TR 5"), where each texture element is mapped to a jack ("Local Jack") within a jack block ("Block").

The texture allocation method of FIG. 3 begins by considering the first jack of the first jack block of the virtual object, in render order, and determining in step 302 whether texture has been allocated for this jack. If not, step 304 directs that a first texture region be created if none currently exist, or, alternatively, proceeds to the current texture region. Step 306 determines whether there is enough space in the current texture region to contain the surface elements in the current jack. The computation in step 306 may involve requiring a margin of extra texture elements in each texture region to accommodate possible surface expansion in a jack block, due to edits that change the amount of surface of the virtual object in a given jack block.

If there is enough space in the current texture region for the current jack, step 310 of FIG. 3 directs that a sufficient number of texture elements needed for the current jack be allocated. In an embodiment where texture elements are quadrilaterals (quads) and surface elements are triangles, step 310 may involve pairing surface elements that share a common edge, and mapping each pair to an available quad. If there is not enough space in the current texture region for the current jack, step 308 of FIG. 3 directs that a new texture region be created, and that all texture elements corresponding to jacks within the current jack block be moved into the new texture region. Thus, in this instance, the entire jack block's texture elements are moved as a unit to a new texture region where more texture elements are available. Then, entries for the transferred texture elements are updated in the Texture Mapper, accordingly.

Step 312 of FIG. 3 proceeds if texture has previously been allocated for the current jack, or, alternatively, following the allocation of texture for the current jack in step 310. Step 312 determines whether the current jack is the last jack in the current jack block. If not, step 318 proceeds to the next jack in the current jack block, and the allocation process starts again at step 302 with the new jack. If the current jack is the last jack in the current jack block, step 314 determines if there is a jack block remaining. If no jack block remains, the allocation process is complete. If there is a jack block remaining, step 316 proceeds to the first jack of the next jack block, and the process starts again at step 302 with the new jack.

Texture allocation methods of the invention support dynamic texture allocation and deallocation—that is, the creation and/or elimination of texture elements corresponding to edited portions of the object, without affecting texture previously allocated for texture elements corresponding to unedited portions of the object. In this way, the invention supports a quick transition from a sculpting mode, or other object editing mode, to a painting mode, or other surface editing mode, and vice versa. The allocation method of FIG. 3 allocates new texture elements when new jacks are created as a result of object edits. The allocation method deallocates (frees, erases) texture elements when their associated jacks are destroyed. When the surface within a voxel changes, for example, due to surface-based editing such as tugging or any operation involving rasterization, a slightly modified method is performed. First, texture previously allocated to the edited jack is preserved by caching it, then the old texture is deallocated while the new texture is reallocated according to the method of FIG. 3. Finally, the cached texture is resampled into the new texture where the surface elements have not changed significantly.

In addition to texture allocation, texture mapping involves the process of texture rendering. While texture allocation need only be performed if texture has not yet been allocated for a given virtual object or when there has been a change that affects the amount of surface of the virtual object, texture rendering is performed once for every frame that is graphically rendered. For example, texture rendering may take place up to about 30 times per second, or more, depending on the complexity of the virtual object being rendered and the capability of the computer system and graphics application used. Texture rendering involves sending data representing the contents of each texture element to a graphics rendering interface, such as a graphics card and/or graphics application. Thus, the texture rendering methods of the invention may optionally include using a commercially-available platform for graphical rendering and hardware acceleration. Moreover, the texture rendering methods of the invention may optionally include the use of a commercially-available graphics application programming interface. Along with sending data representing the contents of each texture element, texture rendering methods of the invention send texture coordinates to the graphics rendering interface/ application in order to correctly relate the texture data to corresponding portions of the surface of the virtual object.

Figure 6:
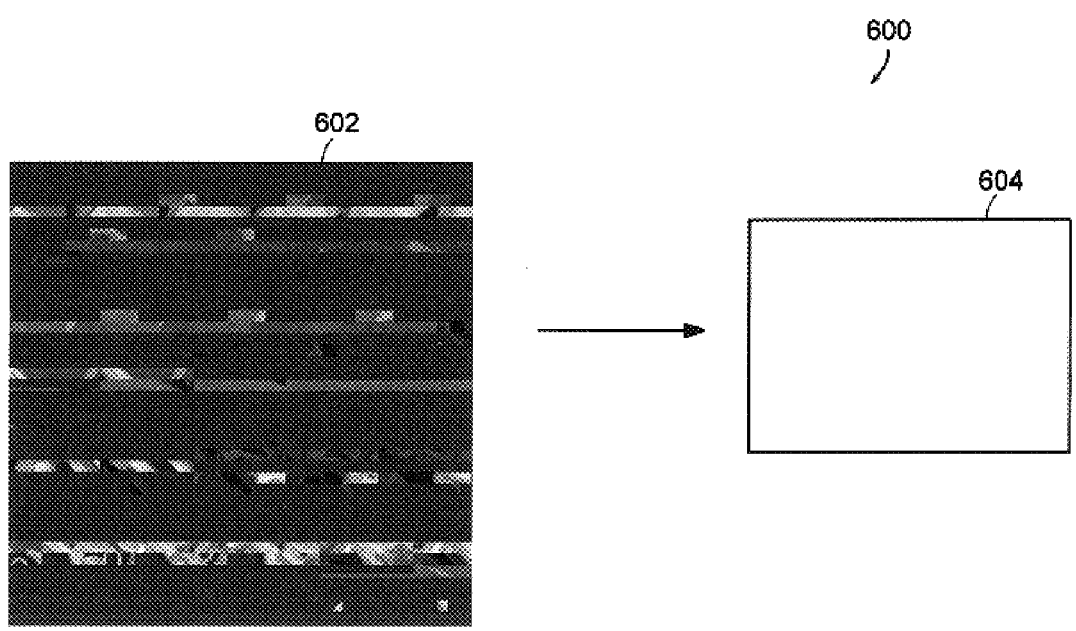
FIG. 6 is a schematic diagram featuring a method of texture rendering that includes binding a blended composite texture for a given texture region to a graphics application and sending 2D texture coordinates to a graphics card, according to an illustrative embodiment of the invention.

FIG. 6 is a schematic diagram 600 illustrating the binding of a blended composite texture 602 for a given texture region to a graphics application and sending texture coordinates to the graphics application via a graphics card 604. Hardware limitations in the rendering of complex virtual objects may be overcome by dividing all the texture that is mapped to a virtual object into a set of texture regions according to the method of FIG. 3.

Figure 7:
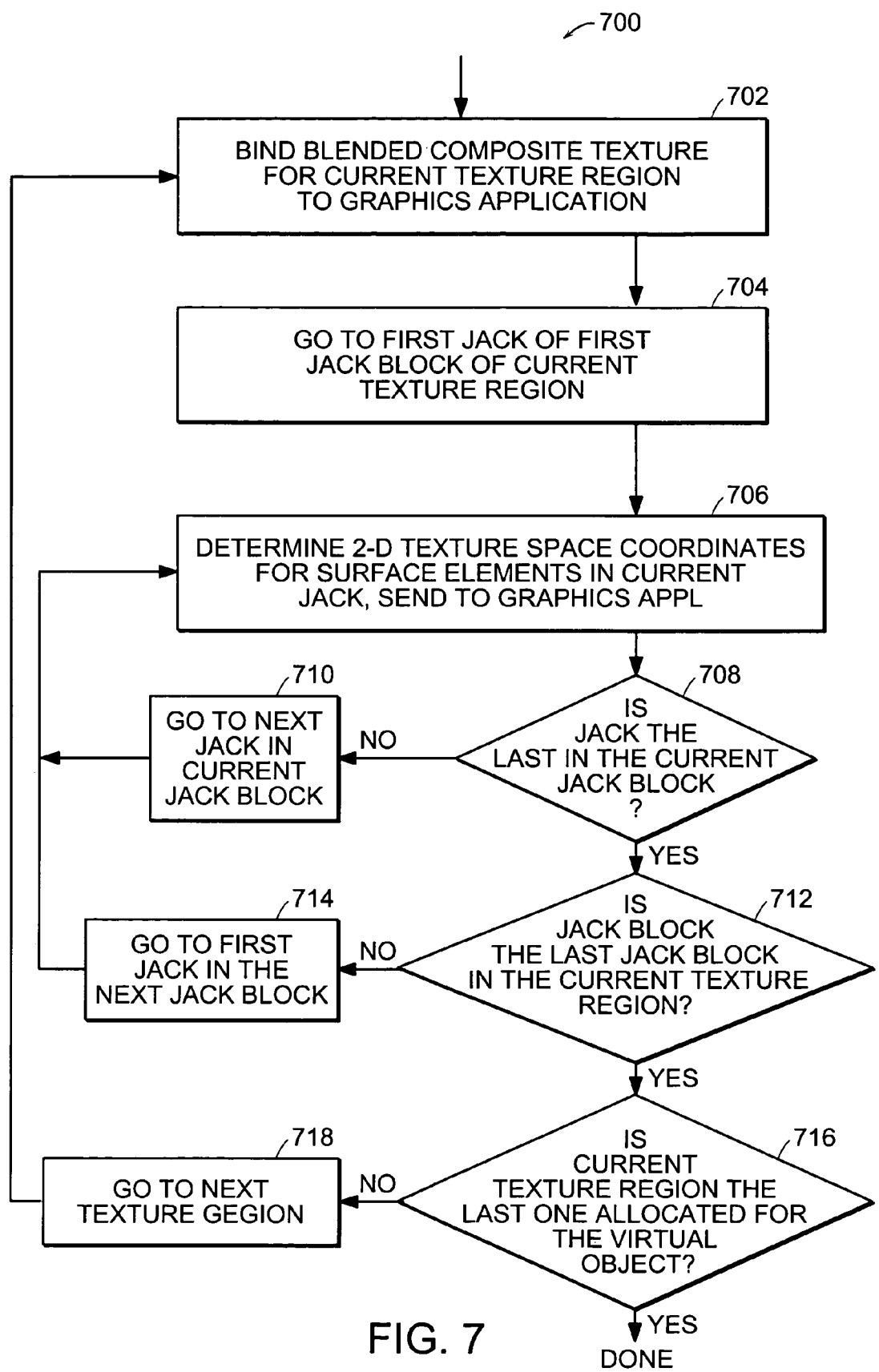
FIG. 7 is a block diagram featuring a method of texture rendering, according to an illustrative embodiment of the invention.

FIG. 7 is a block diagram 700 featuring a method of texture rendering, according to an illustrative embodiment of the invention. Step 702 indicates binding a blended composite texture representing the current texture region to the graphics application. Methods of blending collapsible texture layers to form blended composite textures are disclosed in more detail hereinbelow. In a preferred embodiment, the blended composite texture is a contiguous texture containing all the texture information required by the graphics application in the graphical rendering of the surface of the virtual object. Step 704 indicates the method begins with the first jack of the first jack block of the current texture region; the steps which follow show the order in which the other jacks are considered. In step 706, the rendering method determines two-dimensional texture space coordinates for surface elements in the current jack block, and transmits the information for use by the graphics application. The determination of texture space coordinates for the surface elements in a given jack is an important step in the texture rendering process, and is described in more detail in FIGS. 8A, 8B, 9, and 10.

Steps 708, 710, 712, and 714 of FIG. 7 show the order in which texture space coordinates are determined for elements within a given texture region. Step 706 is performed for each jack of the current jack block, then for each jack of the next jack block within the current texture region. The process continues until step 712 determines that the last jack of the last jack block in the current texture region has been reached. Then, step 716 determines whether the current texture region is the last region allocated for the virtual object. If so, the rendering process has completed its cycle. If not, step 718 indicates that the process returns to step 702 with the blended composite texture for the next texture region. The method proceeds until all jacks have been rendered.

In another embodiment, the method of texture rendering proceeds jack block by jack block, irrespective of texture regions. Here, unlike the method shown in FIG. 7, jack blocks are not rendered in an order according to the texture region in which they lie. As rendering proceeds from jack block to jack block, the texture region in which the current jack block lies is first bound to the graphics application before texture space coordinates are determined for surface elements in each jack of the current jack block. A single texture region may be bound multiple times, depending on the jack block render order. The render order may be adjusted to reduce the number of texture region bindings required.

Figure 8A:
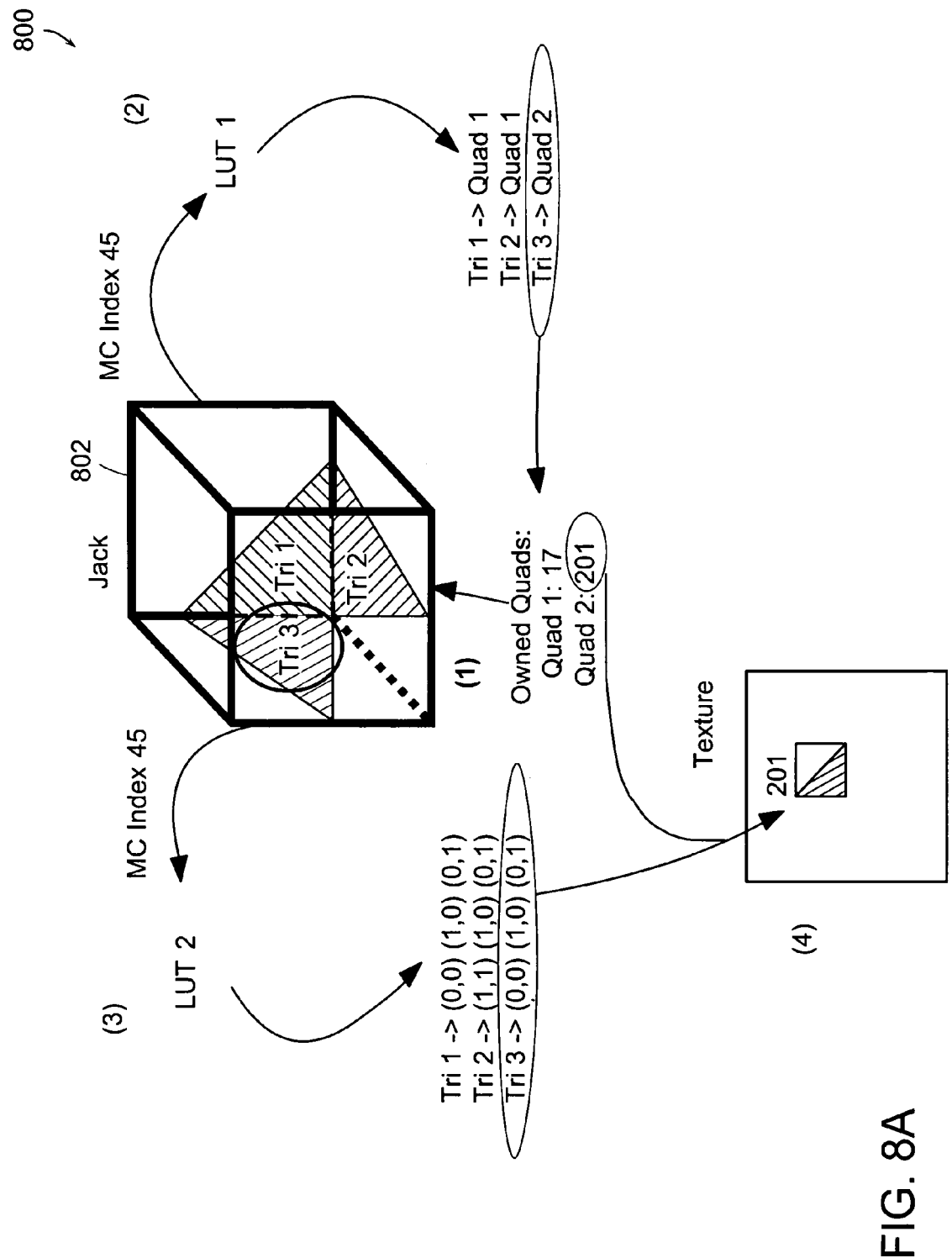
FIG. 8A is a schematic diagram illustrating a method of texture rendering using two look-up tables, according to an illustrative embodiment of the invention.

FIGS. 8A, 8B, 9, and 10 illustrate methods of determining texture space coordinates for the surface elements in a given jack. FIG. 8A is a schematic diagram illustrating the use of two lookup tables derived from an index corresponding to the given jack. Each jack has an index that is produced as a result of a mesh generation process for the voxel-based virtual object, indicating which of a known set of surface element configurations describes the current jack. The index may be, for example, a marching cubes index, derived from an implementation of a marching cubes algorithm that is used to generate a surface mesh for the virtual object. Alternatively, the index may be, for example, a marching tetrahedra index, derived from an implementation of a marching tetrahedra algorithm that is used to generate a surface mesh for the virtual object. At a given point in the rendering process, the surface mesh, with its corresponding indices, may be an initial mesh generated for the virtual object, or the surface mesh may be a re-mesh generated due to a change in the surface of the virtual object, for example, following a carving or other object editing function performed by the user.

Figure 8B:
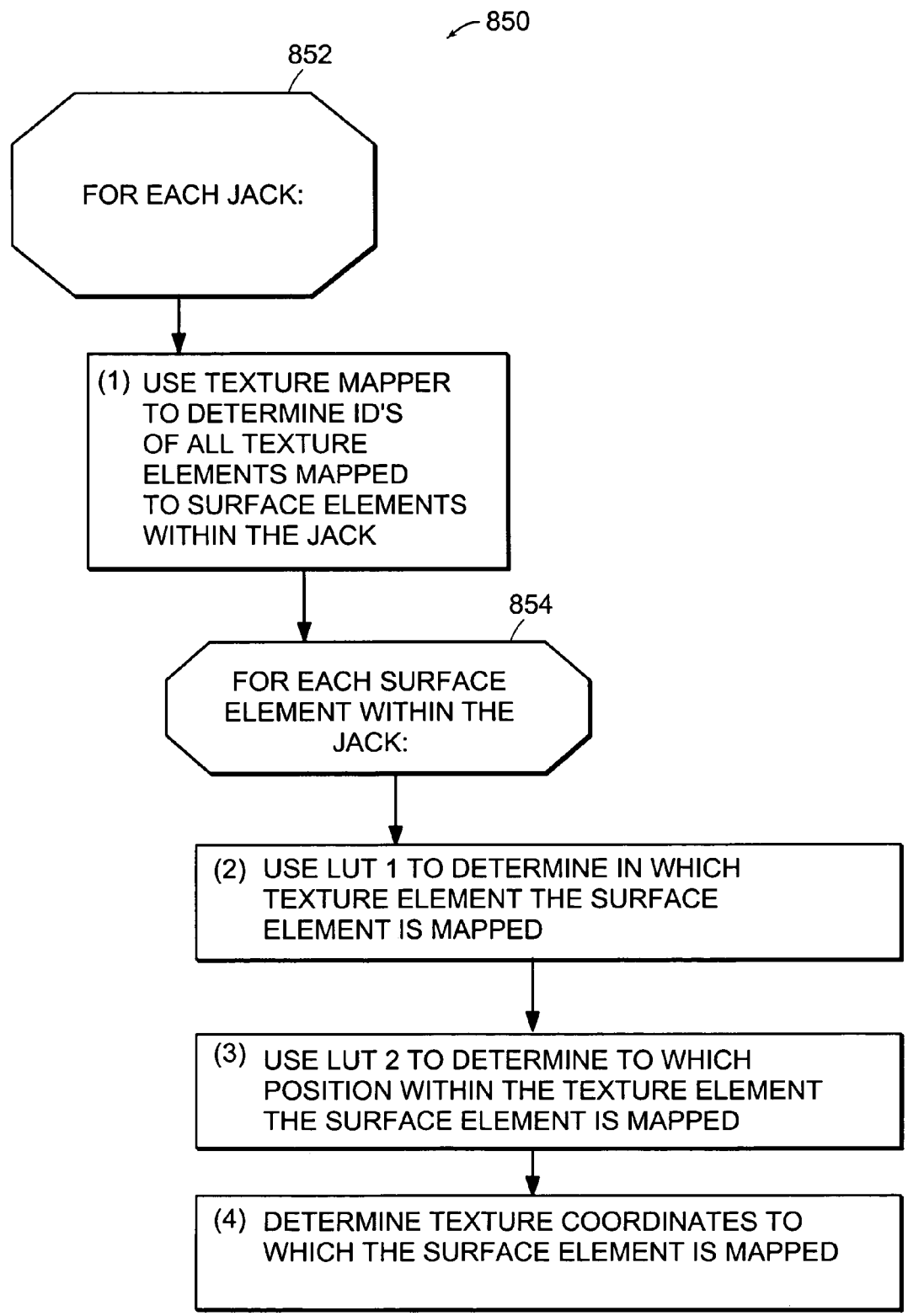
FIG. 8B is a block diagram featuring the texture rendering method illustrated in FIG. 8A applied to each surface element within each jack, according to an illustrative embodiment of the invention.

FIGS. 8A and 8B feature a texture rendering method using two lookup tables to determine texture coordinates for each surface element within a given jack. Other embodiments of the invention use one lookup table, or three or more lookup tables. A lookup table may be a list, a file, or may assume any other form that provides information about surface elements of the virtual object using indices from mesh generation. In a preferred embodiment, the lookup tables are pre-computed, prior to use during graphical rendering. Steps 1–4 illustrated in the schematic diagram of FIG. 8A correspond to the similarly numbered steps in the block diagram 850 of FIG. 8B.

The method illustrated in FIGS. 8A and 8B proceeds by using the Texture Mapper to determine the identification of all texture elements that are mapped to surface elements within a given jack. This is performed for each jack of the virtual model, according to the method illustrated in FIG. 7, and as indicated at reference 852 of FIG. 8B. For example, the jack 802 in FIG. 8A contains three surface elements—labeled Tri 1, Tri 2, and Tri 3—that have been allocated two texture elements (here, quadrilaterals, or "quads"), labeled "17" and "201" in the current texture region. The texture elements were allocated according to the texture allocation method illustrated in FIG. 3.

The rendering method of FIG. 8B proceeds by performing steps 2, 3, and 4 for each surface element within the current jack, as indicated by reference 854. Step 2 uses the first lookup table to determine in which texture element the current surface element is mapped; step 3 uses the second lookup table to determine to which position within the texture element the current surface element is mapped; and step 4 determines texture coordinates within the current blended composite texture to which the current surface element is mapped.

FIG. 8A illustrates steps 2, 3, and 4, described above, performed for a surface element, labeled Tri 3, in a given jack 802 produced by a marching cubes mesh generation algorithm and having marching cubes index "45". Step 2 of FIG. 8A shows that the first lookup table, LUT 1, is used to determine in which of the two quads for this jack the surface element, Tri 3, is mapped. Tri 3 is located in Quad 2 of 2 allocated for jack 802. Step 3 of FIG. 8A shows that the second lookup table, LUT 2, is used to determine to which of two possible positions within the texture element the surface element is mapped. Tri 3 is located in the bottom half of Quad 2 of 2 (position 1). Finally, step 4 of FIG. 8A shows that global texture coordinates are determined for the surface element, Tri 3, by converting the local texture coordinates of its vertices—(0,0), (1,0), and (0,1)—into global texture coordinates within the current texture region using the identification of the texture element, Quad 201, in the Texture Mapper.

Figure 9:
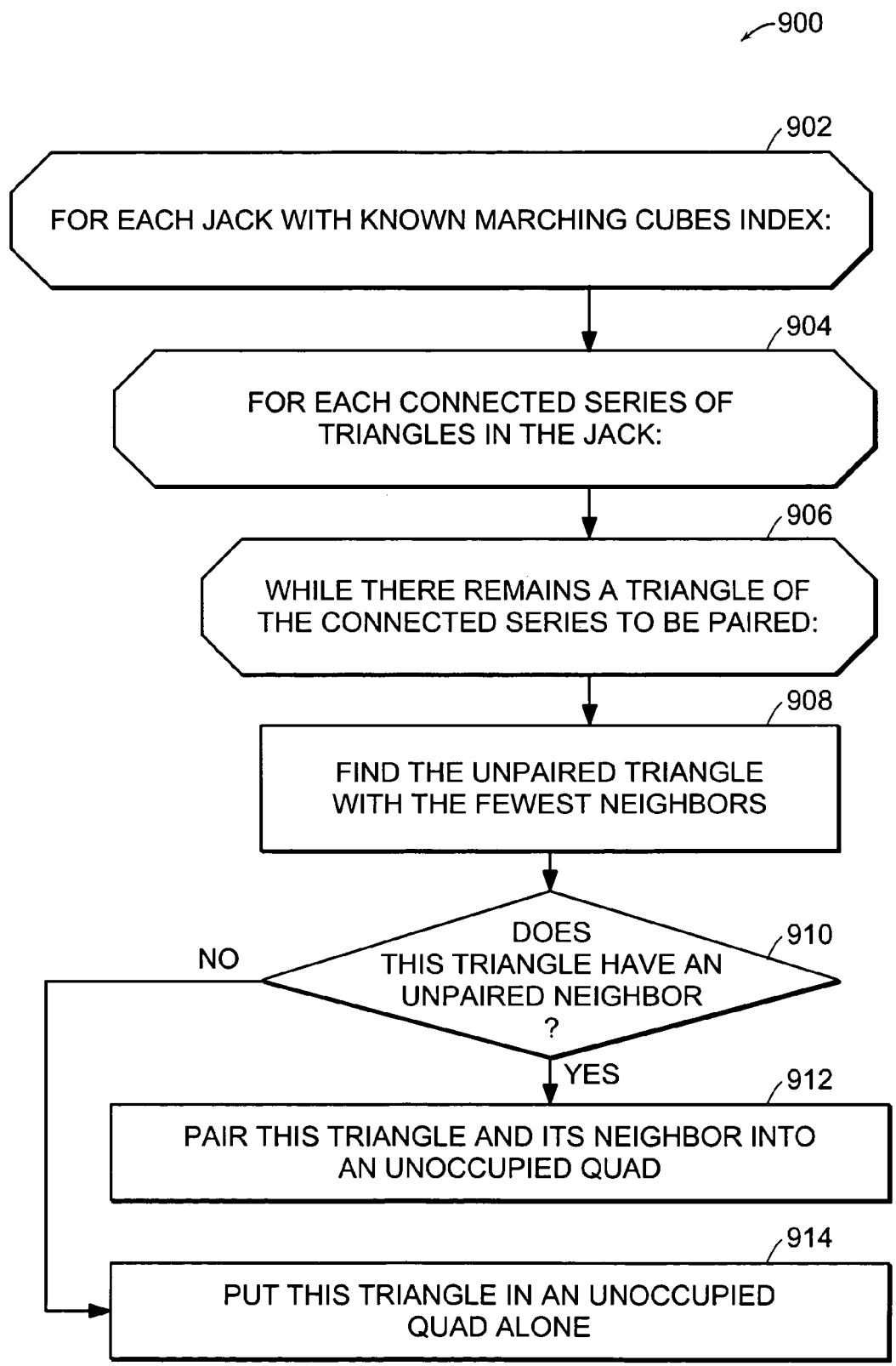
FIG. 9 is a block diagram featuring a method of creating the first lookup table used in the texture rendering method of FIGS. 8A and 8B, according to an illustrative embodiment of the invention.
Figure 10:
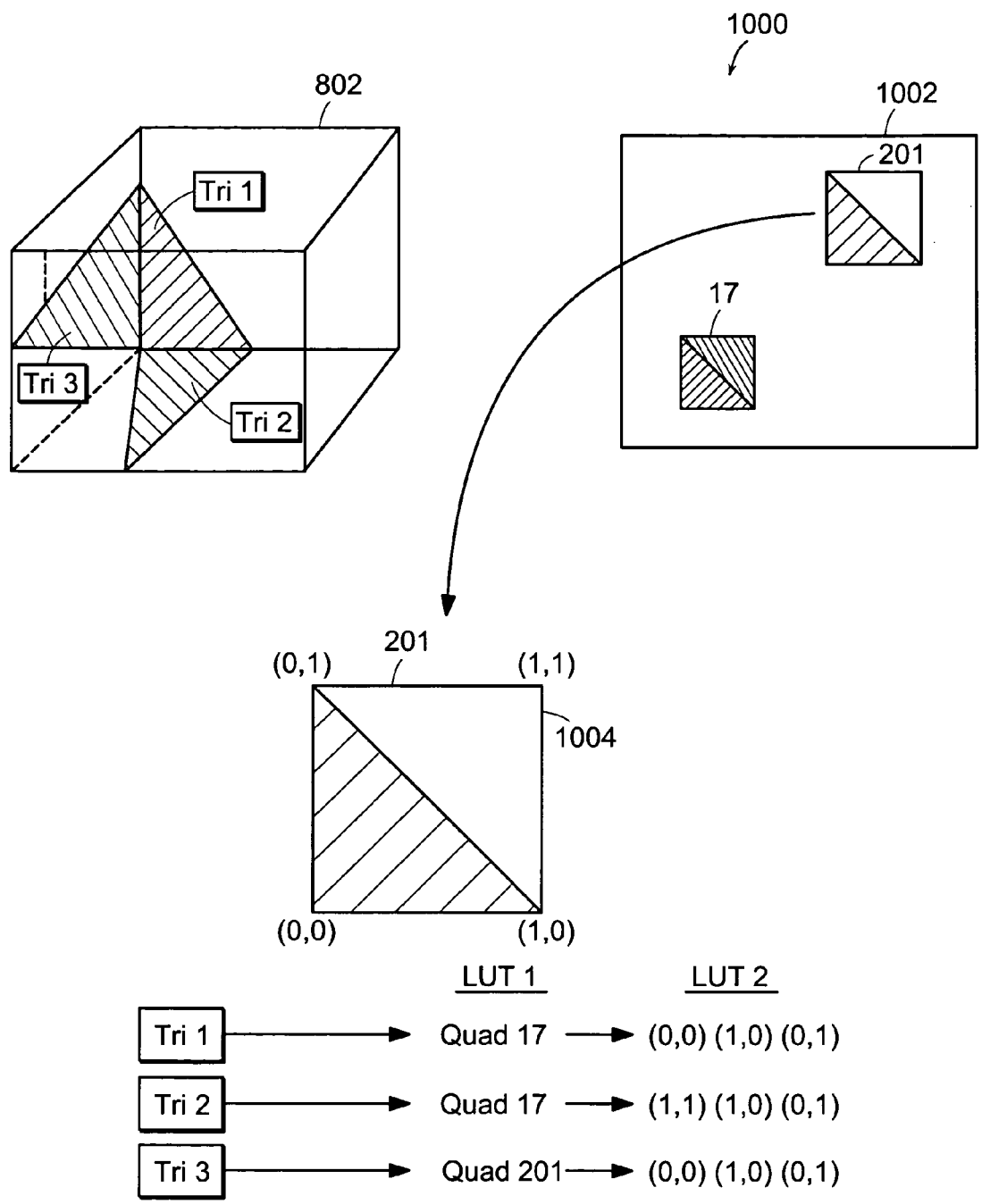
FIG. 10 is a schematic diagram illustrating a method of identifying the texture elements associated with each surface element of a jack and generating texture coordinates for the identified texture elements, using the pre-computed lookup tables featured in FIG. 8A, according to an illustrative embodiment of the invention.

FIG. 9 and FIG. 10 illustrate methods of creating lookup tables used in the texture rendering method of FIGS. 8A and 8B. FIG. 9 is a block diagram 900 featuring a method of creating a first lookup table indicating in which texture element a given surface element is mapped. The method attempts to pair triangles that share a common edge together into the same quad. For the case of a mesh generated using a marching cubes algorithm, there are at most 4 connected series of triangles in any given jack, where a "series" can be one triangle unconnected to another triangle in the jack, or a "series" can be more than one triangle connected to each other in the jack. Therefore, a jack in this instance can consume at most 4 texture quads, each containing either one or two triangles. The method in FIG. 9 of creating the first lookup table finds unpaired triangles with the fewest neighbors 908 by stepping through nested categories: each jack with a known marching cubes index 902, each connected series of triangles 904, and each remaining triangle of a connected series to be paired 906. Step 910 determines whether a given triangle (surface element) has an unpaired neighbor. If so, step 912 pairs the current triangle with its neighbor into an unoccupied quad (texture element). If not, step 914 places the current triangle into an unoccupied quad alone.

The results of the method of FIG. 9 can be seen in FIG. 8A. Since Tri 1 and Tri 2 share a common edge, they are paired into a single quad—Quad 1 of 2 in FIG. 8A, which is Quad 17 of the current texture region. Tri 3 shares a common edge with Tri 1, but since Tri 1 is already paired with Tri 2, Tri 3 is allocated its own texture element—Quad 2 of 2 in FIG. 8A, which is Quad 201 of the current texture region.

FIG. 10 illustrates the creation of the second lookup table. In this embodiment, when a triangle pair is assigned to an unoccupied quad, the first triangle is assigned to the bottom-left half of the quad, with vertex coordinates at the top-left, bottom-left, and bottom-right corners, while the second triangle is assigned to the top-right half of the quad with vertex coordinates at the top-left, top-right, and bottom-right corners. When a single triangle is placed in an unoccupied quad alone, it is assigned to the bottom-left half of the quad. Thus, Tri 3, shown in FIG. 8A and FIG. 10, is placed into the bottom-left half of Quad 201. Thus, as seen in FIG. 8A and at reference 1004 of FIG. 10, Tri 3 has local vertex coordinates (0,0), (1,0), and (0,1). FIG. 10 shows that triangle Tri 1 has local vertex coordinates (0,0), (1,0), and (0,1) in Quad 17 and its pair, Tri 2, has local vertex coordinates (1,1), (1,0), and (0,1).

More sophisticated surface-element-to-texture-element mapping schemes are possible. For example, in one embodiment, where there are a finite number of surface element configurations within a jack that are created during mesh generation, texture elements indicative of each possible surface element configuration within a jack can be pre-computed so that a single texture element is mapped to all the surfaces within a given jack.

When the user paints a virtual object in object space, values are assigned to corresponding texels in texture space. The user "paints" texture elements, in essence, via the link between surface elements of the virtual object in object space and corresponding texture elements in texture space. This process is invisible to the user, who only sees the effects of the painting operation in object space. However, the process of blending brush strokes, occurs in texture space using two-dimensional texture compositing techniques. Graphical user input fills texture layers corresponding to a given texture region; then, the texture layers are combined into a blended composite texture for that texture region. The blended composite texture for each texture region is bound one-at-a-time to a graphics application during texture rendering, as described in more detail elsewhere herein.

Figure 11:
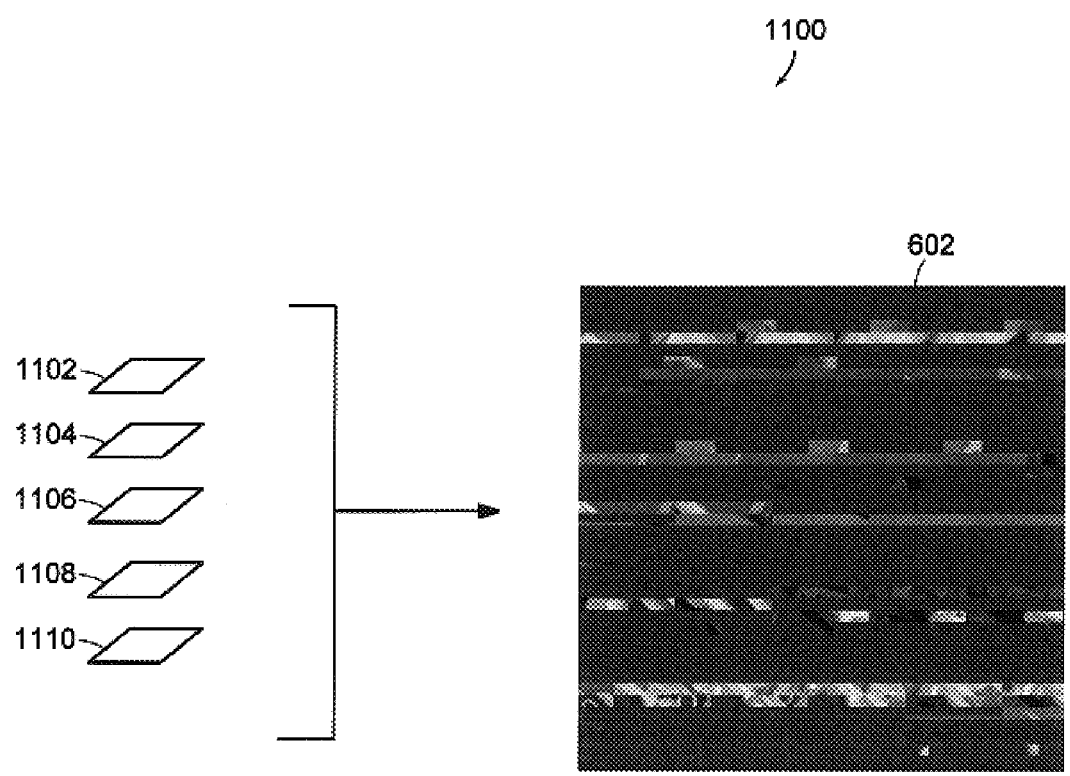
FIG. 11 is a schematic diagram illustrating a method of blending texture layers to form a composite blended texture, according to an illustrative embodiment of the invention.

FIG. 11 features a schematic diagram 1100 illustrating the blending of texture layers 1102, 1104, 1106, 1108, 1110 to form a composite blended texture 602 for a given texture region. Blending may include performing one or more texture compositing operations. There may be any number of texture layers that are blended to form a given blended texture 602. The texture layers may include, for example, scratch textures, paint textures, and/or stencil textures.

A scratch texture indicates one or more intensity values of pixels (and/or texels) associated with each brush stroke. A scratch texture may be thought of as a "template" describing the brush characteristics; for example, the scratch texture may contain intensity values that reflect brush size and/or edge effects. The brush may be assigned a certain width, a varying width along the length of a stroke, a certain shape characteristic of the end of the brush, and/or a "falloff" or transition region along a portion of the brush, such as the edges of the brush. The intensity values in the scratch texture may be used to determine the intensity of a selected color at a given pixel within the brush stroke. For example, a scratch texture comprising values representing a given brush stroke may represent a "falloff" region of the brush stroke by assigning intensity values from 1 (full intensity) at the center, or near to the center, of the stroke, down to 0 (no intensity) at points at the edges of the stroke. Thus, a blended composite of the scratch texture with a paint texture containing a single monochromatic color value would portray a paint stroke with the most intense color at the center of the stroke, falling off to no color at the very edges of the stroke.

As used herein, a brush stroke is an operation performed on a collection of pixels in a texture and/or image. Brush strokes include, for example, paint strokes, erase strokes, pen strokes, lines, characters, and text. The manner in which a brush stroke operates on a collection of pixels may be determined interactively by a user, as in the performance of a paint or erase stroke, using a graphical interface device, or non-interactively—for example, in batch—without any user input. Thus, brush strokes include, for example, batch deletions, batch pastes, and flood fills. The pixels/texels on which a brush stroke operates may be either contiguous or non-contiguous.

The texture layers 1102, 1104, 1106, 1108, 1110 portrayed in FIG. 11 may also include stencil textures. Stenciling allows a user to more accurately control the editing of an image by specifying a maximum amount by which selected portions of the image are allowed to change over the course of a series of brush strokes. Stencil textures are described in more detail herein, for example, in the descriptions of FIG. 15 and FIG. 16.

Figure 12:
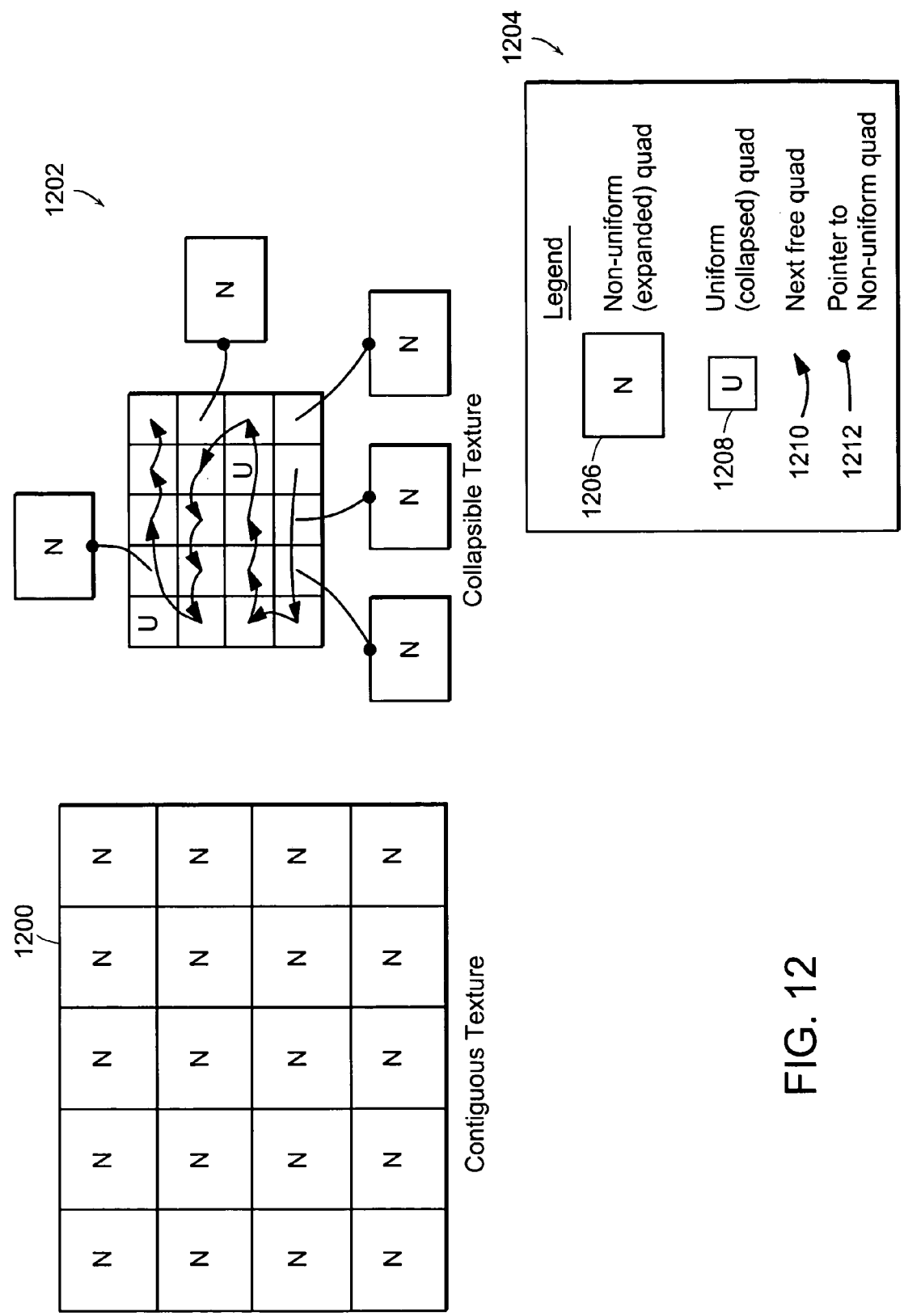
FIG. 12 is a schematic diagram illustrating a method of representing a texture layer as a grid of pointers, according to an illustrative embodiment of the invention.

Texture layers may be stored in "collapsed" form, as shown in FIG. 12, thereby requiring less memory and improving the efficiency of the rendering process. As shown in FIG. 11, the collapsed textures are combined to form a contiguous blended texture suitable for binding to a graphics application. Alternatively, the blended texture may be stored in collapsed form.

A representative contiguous texture 1200 is shown in FIG. 12. The contiguous texture 1200 contains quadrilateral texture elements. Other shapes may be used, alternatively. All texels of each of the elements of the contiguous texture 1200 are represented in normal "expanded" form. Where a given texture element contains limited data, for example, a single color value, it is not necessary to store this value for each of the texels of the given element. Thus, a collapsible texture 1202 can save memory by representing uniform texture elements with the limited data, for example, the single color value applied to all texels of the element.

The collapsible texture 1202 in FIG. 12 is a grid of elements indicating uniform texture elements, non-uniform texture elements, and locations of the nearest free texture element in the grid. Here, an element of the grid may be a value of any bit length (i.e. 32-bit) that represents, for example, the color value of a uniform (collapsed) texture element 1208, the location of the next free grid element 1210, or the location 1212 of a non-uniform (expanded) texture element 1206, as shown in the legend 1204 of FIG. 12. For each collapsible texture 1202, there may be a shadow texture that is used to interpret what kind of information the values of the grid 1202 represent. For example, a shadow texture may comprise codes corresponding to the elements of the grid 1202 that indicate whether a grid element is a uniform quad value, a location or identification number of a free quad, or a pointer to a non-uniform quad.

Texture layers are combined in discrete time slices to form the blended composite image in a pixel-by pixel manner, without interrupting application of additional brush strokes by the user. Each brush stroke within a given texture region may be represented using a scratch texture. An individual brush stroke is divided into a series of stroke segments that are separately blended into the scratch texture. The invention provides a method that prevents double-blending of overlapping portions of segments of the individual brush stroke, thereby avoiding undesired artifacts at the segment ends.

Figure 13:
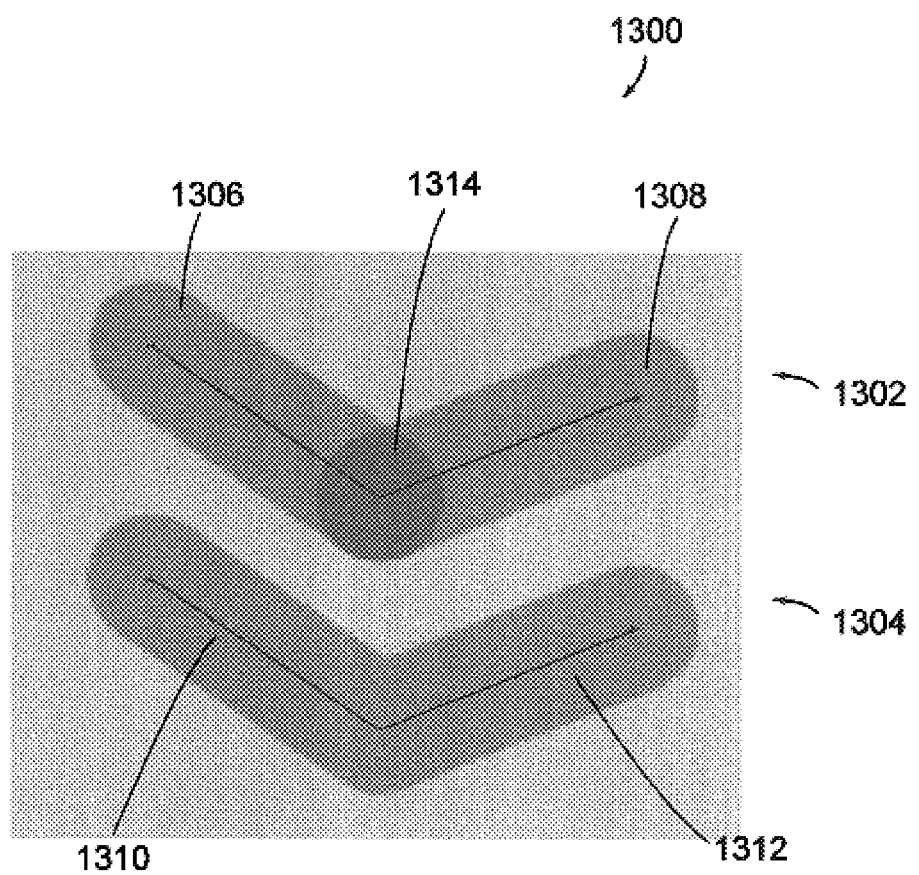
FIG. 13 is a schematic diagram illustrating two pillbox segments of a brush stroke both with and without a double-blending artifact in the overlapping portion, according to an illustrative embodiment of the invention.

FIG. 13 shows a schematic diagram 1300 illustrating two segments of a brush stroke both with 1302 and without 1304 a double-blending artifact in the overlapping portion. Each segment of the brush stroke is represented with a pillbox shape. Brush stroke 1302 is divided into two segments 1306 and 1308, and brush stroke 1304 is divided into two segments 1310 and 1312. The overlapping portion of the two segments in brush stroke 1302 results in higher intensities in the circular region 1314. The blending method performed for brush stroke 1304 avoids the higher intensities in the circular region where the ends of the pillboxes overlap, resulting in a brush stroke of even intensity.

The blending method uses a scratch texture to describe the size and shape of the brush. By assigning a new pixel value to the scratch texture only if it exceeds the existing value at that pixel, the double-blending artifact is avoided. The blending method includes the steps of: (1) receiving brush stroke data from a graphical user interface; (2) for each of a plurality of pixels of a scratch texture, comparing a received pixel value to a value previously written at the corresponding pixel of the scratch texture and assigning the received value to the corresponding pixel of the scratch texture only if it exceeds the existing value; and (3) blending the scratch texture into the target image. Here, the scratch texture is a texture having one or more intensity values of pixels (and/or texels) associated with each brush stroke. The blending step may be performed substantially upon completion of the performance of the paint stroke by the user. Each scratch texture is emptied or deleted after its contents are blended, so that each new brush stroke fills an empty scratch texture.

In order to enhance interactivity, texture layers are blended in the order in which the brush strokes they represent are performed. Texture data is blended pixel-by-pixel in discrete time slices, without interrupting the user's application of additional brush strokes. Thus, multiple scratch textures layers may be blended together where each scratch texture represents an individual brush strokes within a given texture region. This technique is demonstrated in FIGS. 14A and 14B.

Figure 14A:
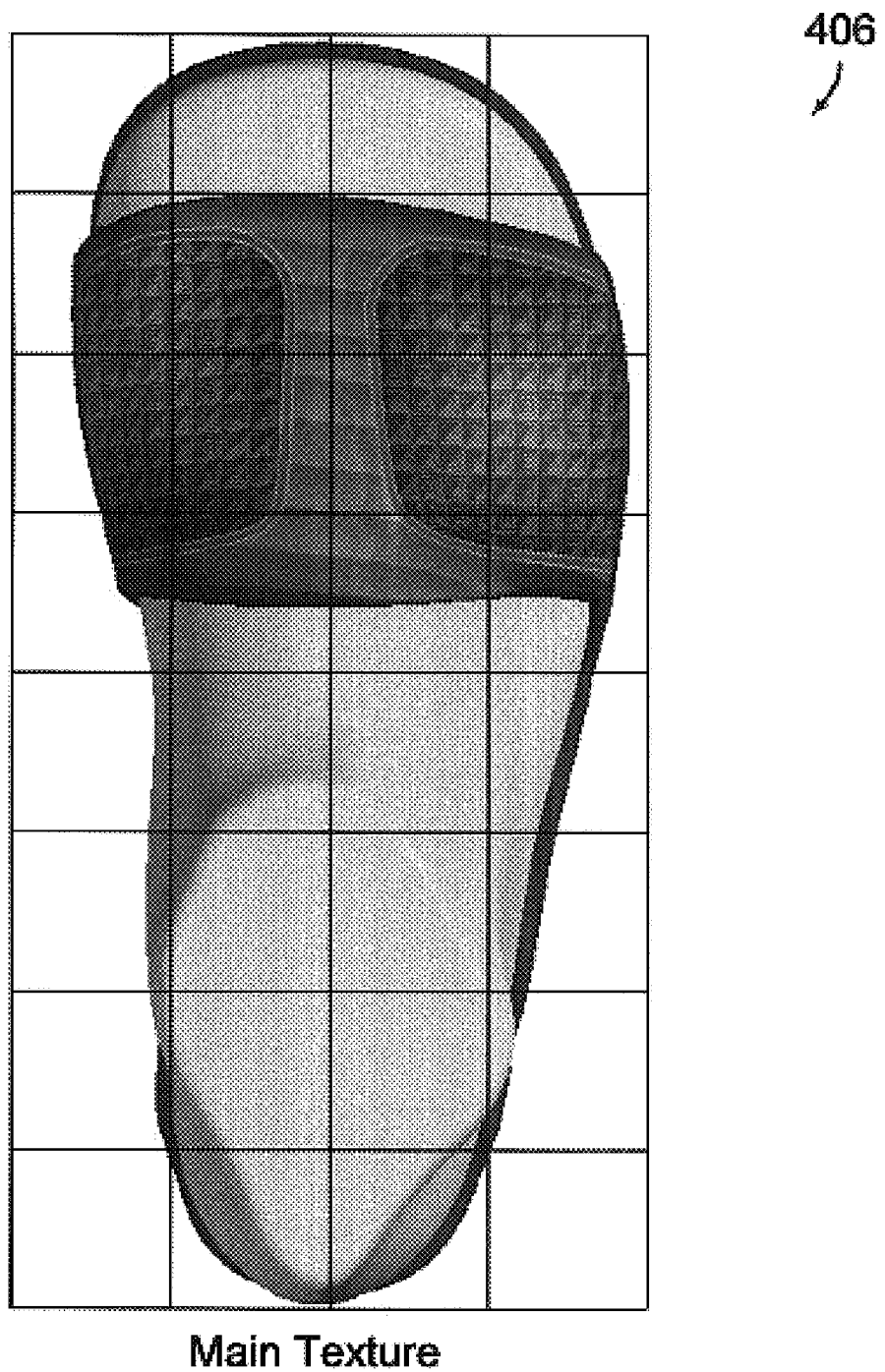
FIG. 14A is a schematic diagram illustrating the partitioning of the three dimensional virtual object into texture regions, according to an illustrative embodiment of the invention.
Figure 14B:
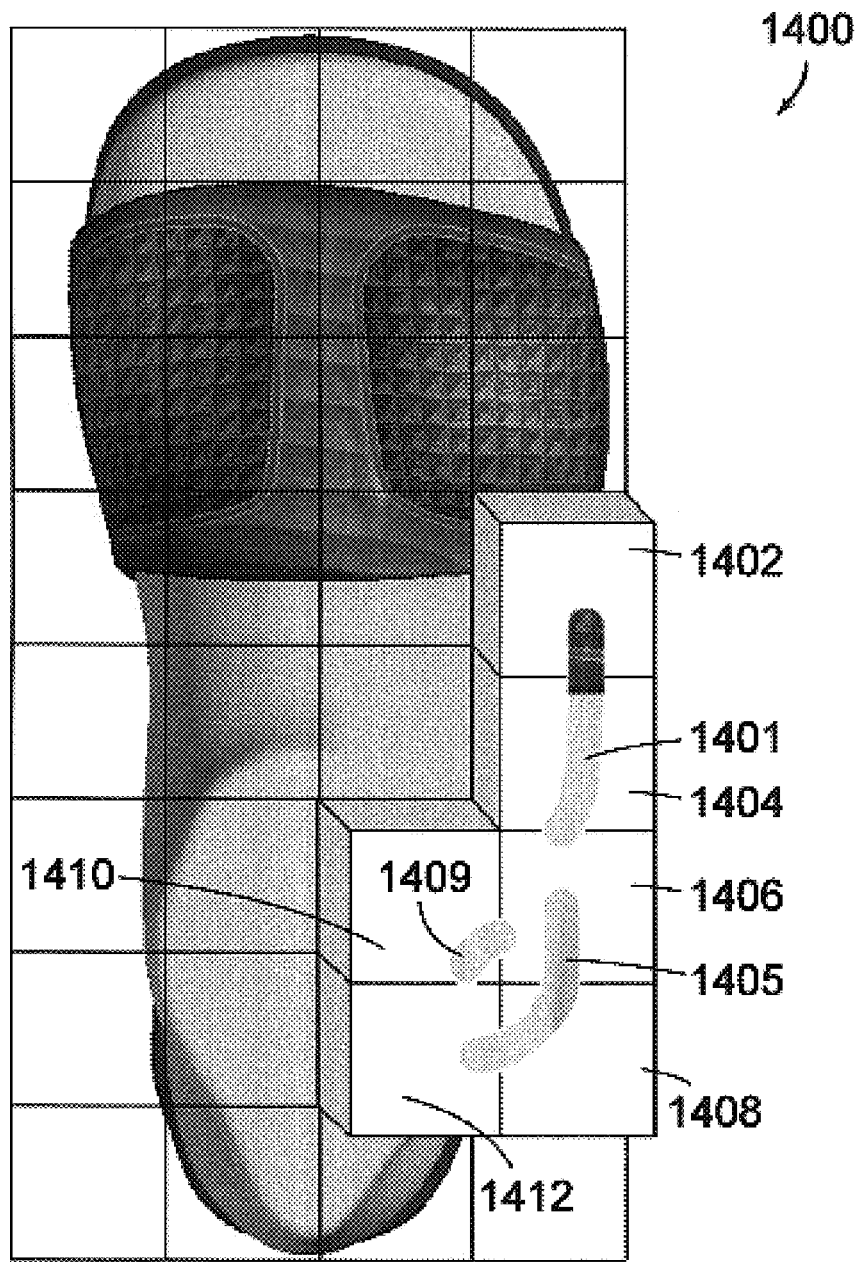
FIG. 14B is a schematic diagram illustrating a method of blending multiple texture layers for each texture region, according to an illustrative embodiment of the invention.

FIG. 14A is a schematic diagram 406 conceptually illustrating the partitioning of a three dimensional object in object space into multiple texture regions. FIG. 14B illustrates the blending of multiple texture layers for each texture region in which a brush stroke falls. When the user begins a brush stroke, a new scratch layer is added for the texture region into the topmost layer. For example, FIG. 14B shows brush stroke 1401 applied by a user in object space, conceptually depicted as affecting texture in texture regions 1402, 1404, and 1406; brush stroke 1405 affects texture regions 1406, 1408, and 1412; and brush stroke 1409 affects texture regions 1410, 1406, and 1412. As the new scratch layer is added for a given texture region into the topmost layer, the bottom-most scratch layer for that region is being blended into the blended composite texture for that region. The raised tiles 1402, 1404, 1406, 1408, 1410, and 1412 in FIG. 14B represent the topmost layer for their respective texture regions.

The texture layers that are combined to form a blended composite texture for a given texture region may include stencil textures. Stencil textures are used to protect a selected region of an image from subsequent editing. The methods of blending texture are compatible with stenciling methods that allow a user to more accurately control the editing of an image by specifying a maximum amount by which selected portions of the image are allowed to change over the course of a series of brush strokes.

The stenciling methods involve protecting an image using a first texture and a second texture, rather than a single texture alone. FIG. 15 is a block diagram 1500 featuring a method of blending brush strokes into a texture layer protected by application of a stencil. The first texture 1502 includes texels with values indicating levels of protection to be applied to corresponding texels of the protected texture 1504. For example, the first texture 1502 may be a map of values indicating one or more regions of the texture to be protected from editing by subsequent paint strokes. The level of protection may be from 0% to 100%, where 0% indicates no protection from subsequent edits, and 100% indicates full protection from subsequent edits. A level between 0% and 100% indicates partial protection, and may correspond to a minimum opacity above which to maintain at least a portion of the protected region throughout the application of subsequent brush strokes.

Overlapping portions may result from multiple overlapping brush strokes and/or from a single brush stroke that overlaps itself. Despite the presence of any overlapping portion(s), and despite the number of brush strokes applied following activation of the stencil, methods of the invention can prevent the opacity of an initial version, or initial layer, of the selected region(s) from decreasing below a specified minimum in any subsequent composite.

The stenciling method illustrated in FIG. 15 proceeds by directing graphical input, for example, brush strokes 1506, into a second texture 1508, rather than directly blending the graphical input into the protected texture 1504. The second texture 1508 acts as a buffer accumulating graphical input. The protected texture 1504 may be combined along with other texture layers into a blended composite texture for the given texture region, or, alternatively, the protected texture 1504 may, in fact, be the blended composite texture for a given texture region.

The interactivity of the user's image editing experience may be preserved by use of a display texture 1510. In one embodiment, texels of the protected texture 1504 are copied directly into a display texture 1510, while texels of the second texture 1508 are modified according to the first texture 1502, then blended into the display texture 1510.

User interactivity is preserved by modifying texels of the second texture and blending the modified texels into the display image on a texel-by-texel basis. In this way, the user sees the resulting image emerge, subject to the user-specified protection, as the user continues to apply brush strokes.

The display texture can reflect real-time user brush strokes, as well as preserve a minimum opacity of the original texture layer within a protected region, regardless of the number of brush strokes that follow. This is because, in a preferred embodiment, each update of the display texture is performed by: (1) re-copying texel values of the original protected texture layer into the display texture texels, and then (2) compositing the modified second texture texels with the display texture texels. The display texture 1510 may be updated at a rate of up to about 30 times per second, or more, depending on the complexity of the image and the computational speed for graphical rendering. The update rate may be less for more complex images or for slower machines—for example, from about 10 times per second to about 20 times per second.

The use of a display texture 1510 is optional. Whether or not a display texture 1510 is used, methods of the invention can preserve a minimum opacity of the original image layer within a protected region by accumulating graphical input in the second texture 1508, modifying the second texture 1508 using the first texture 1502, and, subsequently, blending the modified second texture 1508 into the protected texture 1504.

The user may provide one or more signals indicating the beginning and/or ending of the period of time in which brush strokes are accumulated in the second texture. The user provides a first signal, such as a button click, to indicate the beginning of the application of a stencil. Alternatively, the stencil may self-activate once the user defines the first texture. The step of defining the first texture may include indicating: (1) one or more regions of the surface of a virtual object to be protected; and/or (2) one or more levels of protection to apply within the one or more regions. The surface elements within the region indicated by the user in object space are mapped to corresponding texture elements in texture space.

Once the stencil is active, graphical input representing brush strokes by the user are directed into the second texture 1508. When the user has completed one or more brush strokes, the user may provide a second signal to deactivate the stencil. In one embodiment, once the stencil is deactivated, the second texture 1508, modified by the first texture, is blended into the protected texture 1504.

Figure 16:
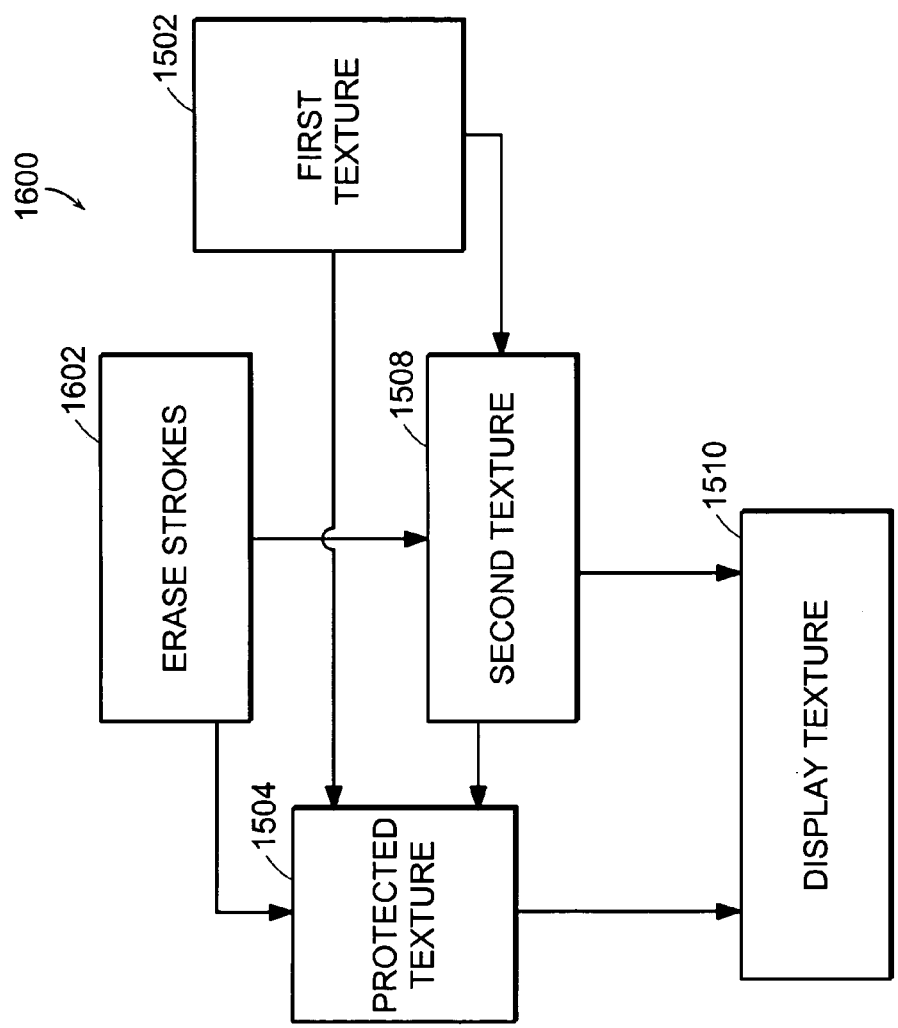
FIG. 16 is a block diagram featuring a method of blending erase strokes into a texture layer, where the method protects one or more selected regions of the image from subsequent editing, according to an illustrative embodiment of the invention.

Real-time display of erase strokes requires modification of paint strokes applied both before and after activation of the stencil. FIG. 16 is a block diagram 1600 featuring a stenciling method in which erase strokes 1602 are blended into a protected texture 1504. Generally, the second texture 1508 contains data from paint strokes applied after activation of the stencil, but not before. Therefore, the step of modifying a value of one or more texels of the protected texture 1504 is performed prior to copying texels of the protected texture 1504 into the display texture 1510 and compositing the modified second texture texels with the display texture texels. Texel values of the protected texture 1504 are modified according to the level(s) of protection indicated in the first texture 1502.

In one embodiment, a minimum opacity of an original texture layer may be preserved despite repeated erase strokes within the protected region, where overlapping erase strokes result in the attenuation of a texel value of the protected texture down to a minimum value, but no further. The minimum value is determined from the protection level of that texel as indicated in the first texture 1502. In cases where texels are represented by RGBA quadruples, the first texture 1502 may be used to derive a minimum alpha channel value below which the texel values of the protected texture 1504 are not allowed to fall. Pixel values and/or texel values include values of any bit depth, where bit depth generally ranges from 1 to 64 bits per pixel. Pixel values include grayspace values, RGB colorspace values, RGBA colorspace values, or any other colorspace values, such as HSL, HSV, CMY, CMYK, CIE Lab, and R-Y/B-Y. Preferred methods of the invention are performed using 24-bit, RGBA colorspace pixels, although any bit depth and/or colorspace format may be used.

The display methods discussed herein work where a user performs paint strokes, erase strokes, or both paint and erase strokes, while the stencil is active. Additionally, these display methods preserve the interactivity experienced by the user during the editing process, while maintaining the protection offered by the stenciling methods described herein.

Methods of the invention involve the modification of paint colors of images and/or textures, as well as the blending of paint colors between two or more images and/or textures. For example, in one embodiment, pixels of the second texture 1508 are modified using the first texture 1502, where the first texture 1502 is a map of values indicating protection levels for the protected texture 1504 and the second texture 1508 contains accumulated graphical input. A texel of the second texture 1508 may be modified by attenuating its color value according to the protection level in the first texture 1502 corresponding to that texel.

Blending of images and/or textures may be performed using one or more compositing operations. For example, in one embodiment, texels of the second texture 1508 are blended into the protected texture 1504. This may be done by performing a compositing operation, such as an "overlay" operation in RGBA colorspace, between the second texture 1508 and the protected texture 1504.

Figure 17:
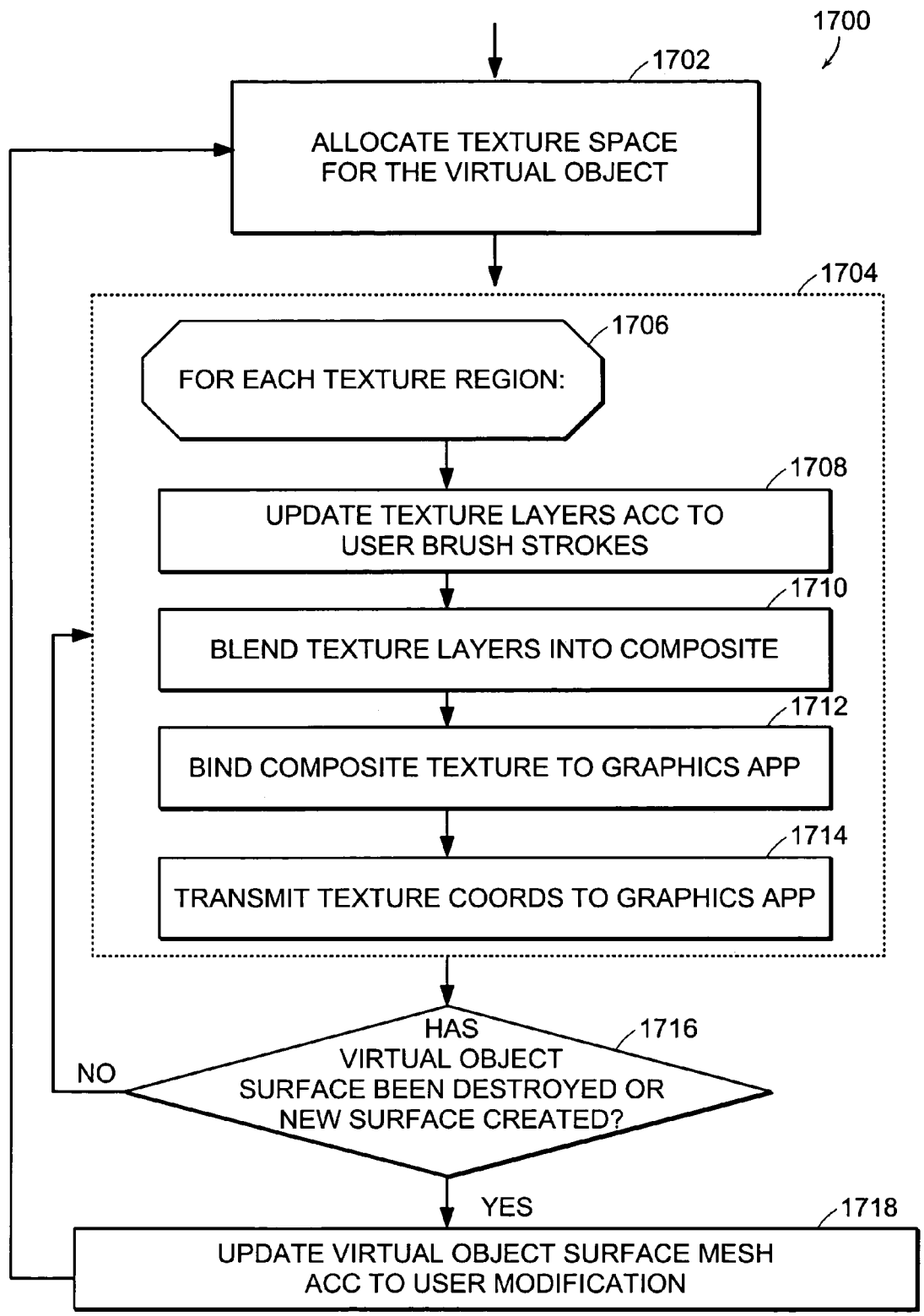
FIG. 17 is a block diagram featuring a method of texture painting in which texture space is dynamically allocated following object modification by the user, according to an illustrative embodiment of the invention.

Because texture is dynamically allocated, a user may seamlessly switch between an object modification mode (for example, a sculpt mode) and a surface paint mode without losing paint information for unaffected surfaces of the virtual object. FIG. 17 is a block diagram 1700 featuring a method of texture painting in which texture space is dynamically allocated following modification of the virtual object. FIG. 17 may represent part or all of a graphics thread for graphically rendering the virtual object. Throughout the process depicted in FIG. 17, the user may apply any number of brush strokes directly onto the three dimensional object in object space using, for example, a haptic interface device. The user may also switch from the painting feature to a sculpting feature, and back again. For example, the method of FIG. 17 may be initiated every time the user enters the painting feature, for example, by clicking an icon or button, or by providing some other signal.

Step 1702 of the painting method illustrated in FIG. 17 allocates texture space for the virtual object according to methods described herein, for example, the texture allocation method depicted in FIG. 3. Step 1704 describes the creation and rendering of blended composite textures for each of a plurality of texture regions, as shown, for example, in FIGS. 7 and 11. Step 1704 may be performed multiple times per second, for example, up to about 40 times per second or more. For more complex virtual objects, step 1704 is performed at a slower rate—for example, from about 10 Hz to about 30 Hz.

Step 1704 of FIG. 17 performs a set of substeps for each of a plurality of texture regions, as indicated at reference 1706. The substeps include updating texture layers according to user brush strokes 1708, combining the texture layers into blended composite textures 1710, binding the composite texture to a graphics application (where the graphics application provides hardware and/or software for display of the virtual object in object space) 1712, and transmitting texture coordinates to the graphics application 1714. After one or more render cycles of step 1704, the method determines in step 1716 whether the user has modified the virtual object such that any surface is destroyed or new surface is created. If not, the creation and rendering of blended composite textures of step 1704 continues. If surface is created or destroyed, the surface mesh for the virtual object is updated according to the user modification. For example, if the user has sculpted the object and has re-entered the painting feature, step 1718 updates the surface mesh by remeshing at least a portion of the virtual object. The mesh generation step may employ a marching cubes algorithm, for example, if the model is a voxel-based model. Then, the method of FIG. 17 proceeds to step 1702, where texture is allocated, for example, according to the method of FIG. 3, which prevents reallocation of texture for surface elements in unmodified jacks. The creation and rendering of blended textures in step 1704 then continues as before.

An embodiment of the painting method of FIG. 17 allows a user to paint with brush strokes whose characteristics are reflected in corresponding scratch textures. For example, each brush stroke may include a falloff region, or transition region, near the edges of the brush stroke such that the paint appears to fade into the background color at the edges of the brush. Each stroke is divided into segments that link positions of a graphical interface device, such as a stylus or other painting tool. The positions are recorded at successive frames as the user moves the graphical interface device in real space, and, preferably, while the user views a graphical rendering of the virtual object in object space. The display may represent the virtual object using a Cartesian coordinate system, or any other coordinate system. Surface elements of the object which fall within a volume of influence of the tool are painted.

Figure 18:
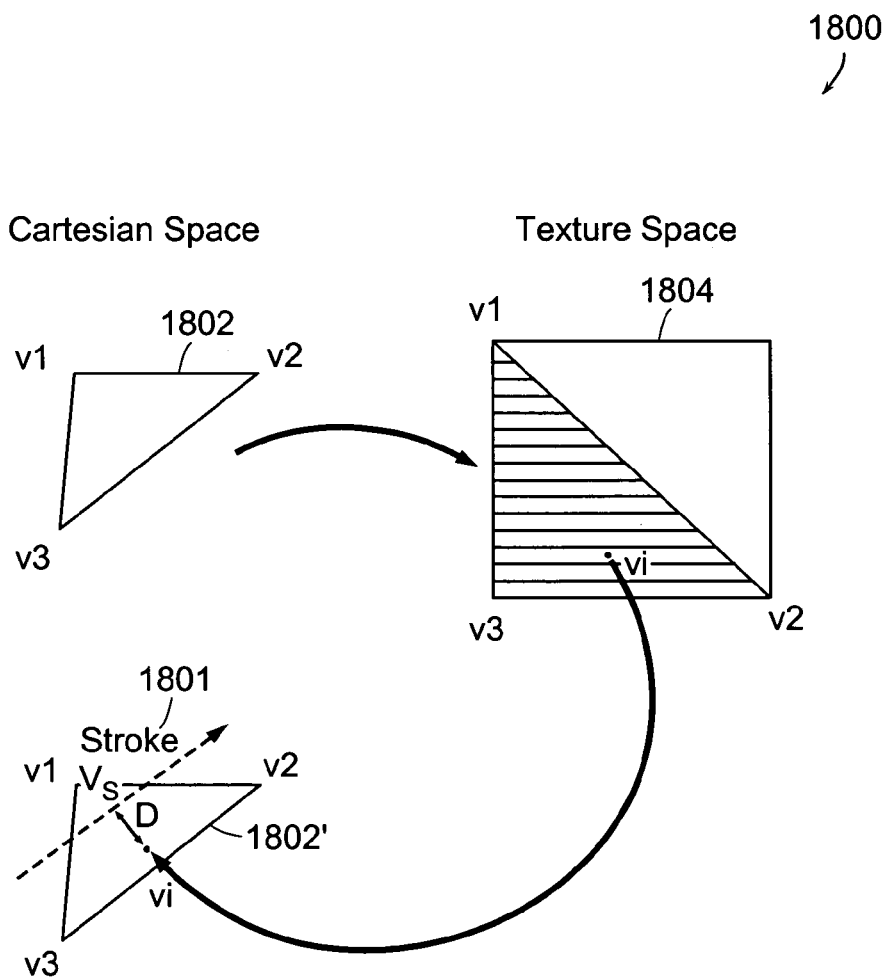
FIG. 18 is a schematic diagram illustrating a method of texture painting in which a brush stroke falloff is represented in texture space by computing the distance between a point in object space corresponding to a pixel and a point along the center of the brush stroke, according to an illustrative embodiment of the invention.

FIG. 18 is a schematic diagram 1800 illustrating a method of painting a surface element 1802 affected by a brush stroke 1801, where the brush stroke 1801 has a falloff region at its edges. Similar methods are performed for brush strokes with other attributes or characteristics. Triangle 1802 represents a surface element in object space, and triangle 1802' shows the surface element with the path of a user's brush stroke 1801 superimposed. Since triangle 1802 falls within a volume of influence of the brush stroke 1801, it will be painted. The surface element 1802 is mapped to quadrilateral 1804 in texture space, according to the texture mapping methods discussed herein. Color intensities corresponding to the brush stroke 1801 are assigned to texels of the texture element 1804, which is used to graphically render the surface element 1802 in object space. Since the paint stroke has a falloff region at its edges, there may be a variation of color intensities assigned to the texture element 1804. FIG. 18 shows how an intensity is assigned to a texel of the texture element 1804 following its scan conversion based on the position of vertices v1, v2, and v3 of the corresponding surface element 1802.

Figure 19:
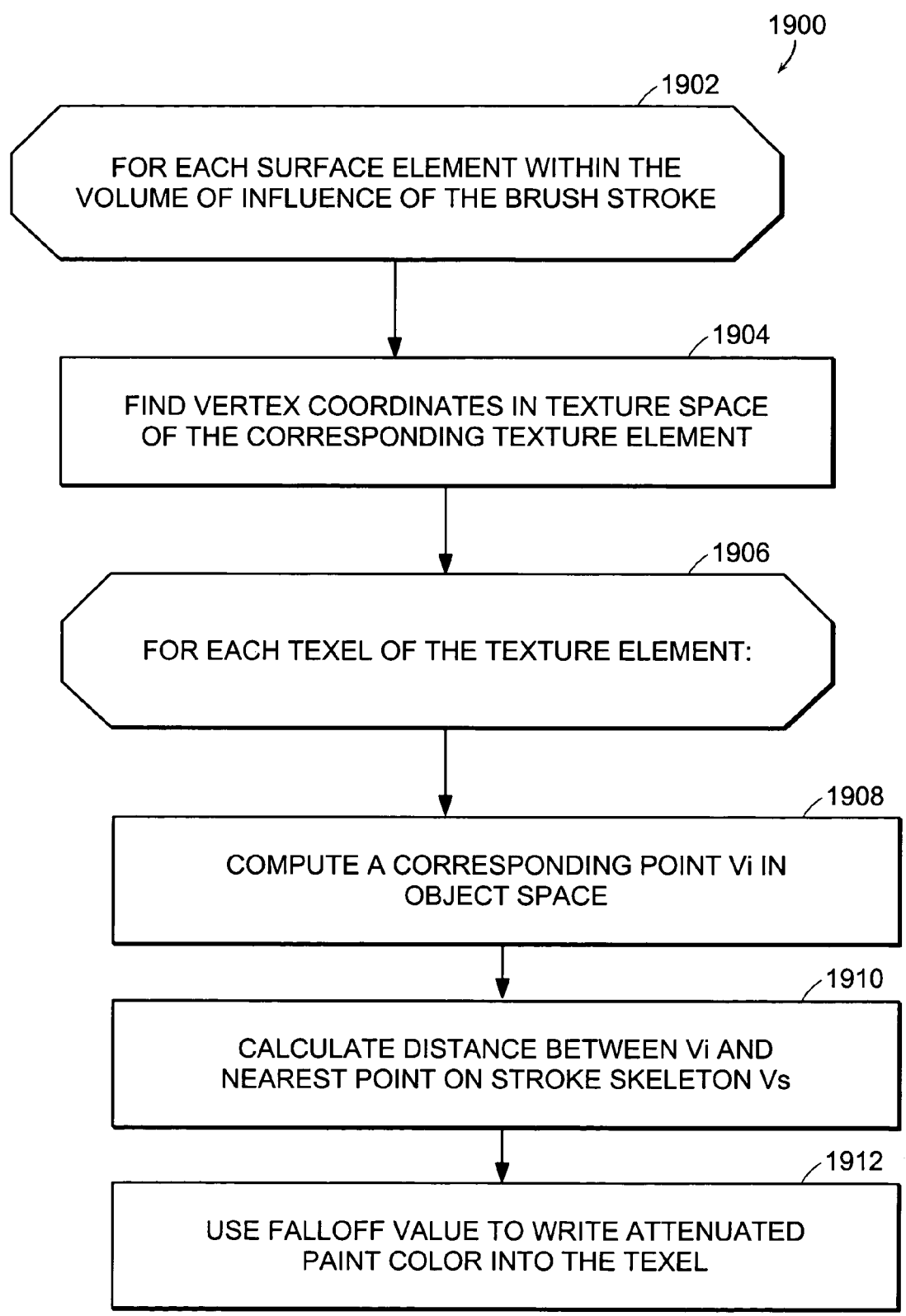
FIG. 19 is a block diagram featuring a method of texture painting with a brush stroke falloff as illustrated in FIG. 18, according to an illustrative embodiment of the invention.

FIG. 19 shows a block diagram 1900 of representative steps of the method illustrated in FIG. 18. Reference 1902 indicates that the steps which follow are performed for each surface element within the volume of influence of the brush stroke. An example surface element 1802 within a volume of influence of a brush stroke 1801 is depicted in FIG. 18. Step 1904 of FIG. 19 finds vertex coordinates in texture space of the texture element corresponding to the surface element in object space. For the surface element 1802 in FIG. 18, the vertex coordinates v1, v2, and v3 of the texture element 1804 are determined in step 1904. Then, reference 1906 of FIG. 19 indicates that steps 1908, 1910, and 1912 which follow are performed for each texel of the current texture element. Step 1908 computes, for the current texel of the current texture element, a corresponding point vi in object space by interpolating with respect to the vertex positions in texture space. For example, in FIG. 18, for the texel centered at position vi in texture element 1804 in texture space, the point vi is located in triangle 1802' in object space by interpolating with respect to the vertex positions v1, v2, and v3 in texture space. Once the point in object space is located, step 1910 of FIG. 19 calculates the nearest point on the stroke skeleton, and/or the shortest distance to the stroke skeleton, in order to determine a "falloff" value. For example, in FIG. 18, the point vs on the stroke skeleton nearest point vi is located, and the distance D is computed. The "falloff" value, or attenuation factor, to apply at point vi is then computed as a function of D. Step 1912 of FIG. 19 then uses the falloff value to write an attenuated version of paint color into the texel. For example, in FIG. 18, the computed falloff value based on distance D is used to attenuate a color value chosen for the paint stroke 1801, and the attenuated color value is written into the texel centered at vi in the texture element 1804.

FIG. 20 is a block diagram featuring an example computer system architecture 2000 for graphically rendering a virtual object according to methods of the invention. The architecture 2000 in FIG. 20 is presented in UML format. The legend 2001 describes how connected classes and textures of the architecture are related. The workspace data 2002 contains a class for storing all of the texture data, designated the "Texture Manager" 2004. The "Texture Region" block 2006 in FIG. 20 represents a container for all texture classes in each of the texture regions of a virtual object being graphically rendered. For example, a virtual object with three texture regions has three "Texture Region" 2006 containers. The "Texture Mapper" 2008 is a list that identifies texture elements corresponding to each of the jacks of the virtual object being graphically rendered. For example, the "Texture Mapper" 2008 may be a hash map of hash maps identifying each texture element corresponding to surface(s) in each jack of each jack block, as shown in the schematic diagram 500 of FIG. 5.

For each texture region, there is an interface, labeled "IComposite Color Texture Region" 2010 in the architecture 2000 of FIG. 20, that represents a stack of texture layers for the texture region. This interface 2010 is implemented by a texture that blends and stores paint layers (and/or brush stroke layers), labeled "Composite Color Texture Region" 2012. This texture 2012 contains a texture storing color per texel, labeled "Color Texture Region Component" 2016 in FIG. 20, as well as multiple textures storing paint layer data, labeled "Color Texture Region Layer" 2022. The "Color Texture Region Component" 2016 is a contiguous texture. A contiguous texture may be needed for proper binding of a blended composite texture with a computer graphics application for graphical rendering display.

The "Texture Region Component" 2014 in the architecture of FIG. 20 is a template for a contiguous texture class. The "Quad Texture Region Component" 2018 is a template for a "collapsible" texture class, which can be instantiated as a "Color Quad Texture Region Component" 2020, the texture storing color per texel in collapsed form.

FIG. 21 depicts a computer system architecture 2100 that shares a number of components with the architecture 2000 of FIG. 20, but has some additional components. The additional components include a class managing the blending of paint strokes, "Texture Stroke Manager" 2104, a class managing the undoing of paint removal during modifications of the virtual object (i.e. during sculpting of the object), "Texture Undo Manager" 2106, and a class for allocating texture, "Texture Allocator" 2108. The architecture 2100 in FIG. 21 also further specifies that the "Composite Color Texture Region" 2012 texture for storing and blending paint layers contains multiple "Scratch Texture Region Component" 2112 textures for storing temporary paint strokes (scratch textures), as well as a "Selection Texture Region Component" 2114 texture for storing a user selection, such as a stenciled region. Textures 2112 and 2114 instantiate the template for collapsed textures—the "Quad Texture Region Component" 2018—via a texture that stores intensity per pixel, called the "Intensity Quad Texture Region Component" 2110.

Any of the methods described herein for graphically rendering a virtual object may be combined with haptic rendering of the virtual object. For example, an embodiment of the invention haptically renders the virtual object in real time as the user applies a brush stroke onto the surface of the virtual object in object space. The haptic rendering process includes determining a force feedback corresponding to a position of a haptic interface device held by the user as the user applies a brush stroke using the device. The force is delivered to the user via the haptic interface device. A haptic rendering process is described, for example, in U.S. Pat. No. 6,552,722, by Shih et al., the text of which is hereby incorporated by reference in its entirety.

A combined haptic and graphical rendering method of the invention performs haptic rendering at a substantially faster rate than graphical rendering. This may be necessary to provide realistic force feedback to the user. In one embodiment, graphical rendering is performed within a range from about 5 Hz to about 150 Hz, while haptic rendering is performed within a range from about 700 Hz to about 1500 Hz. In another embodiment, haptic rendering is performed at about 1000 Hz, while graphical rendering is performed at up to about 40 Hz. Haptic and graphical rendering of a virtual object may be performed by different threads of an overall rendering process.

Figure 22:
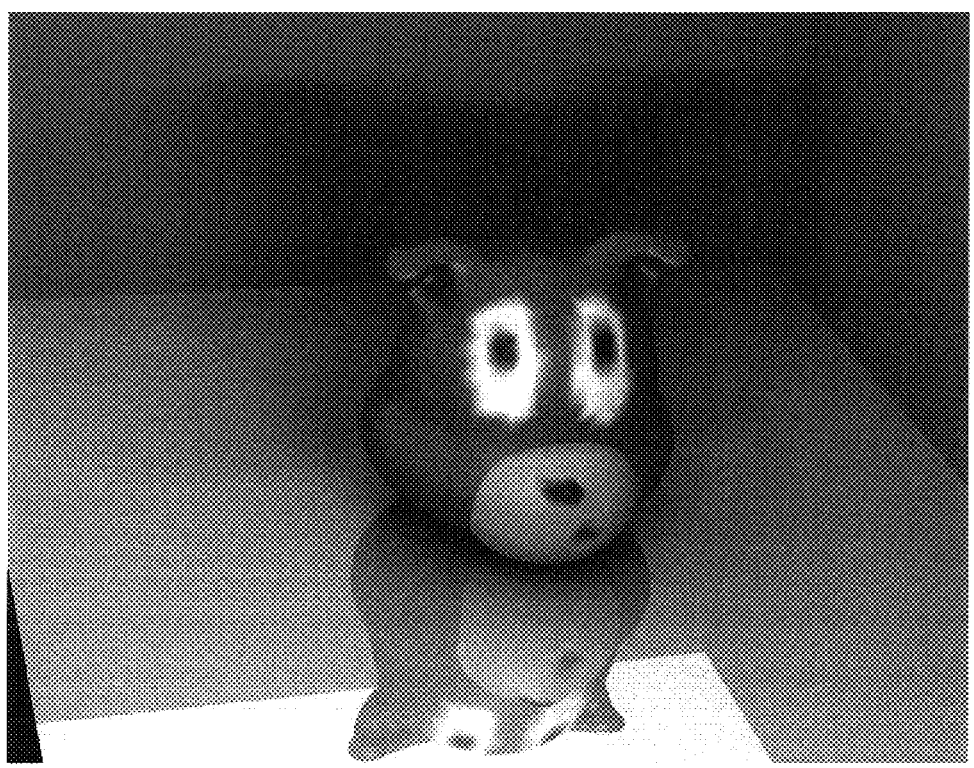
FIG. 22 is an image of a virtual object whose surface has been painted using a vertex painting method.
Figure 23:
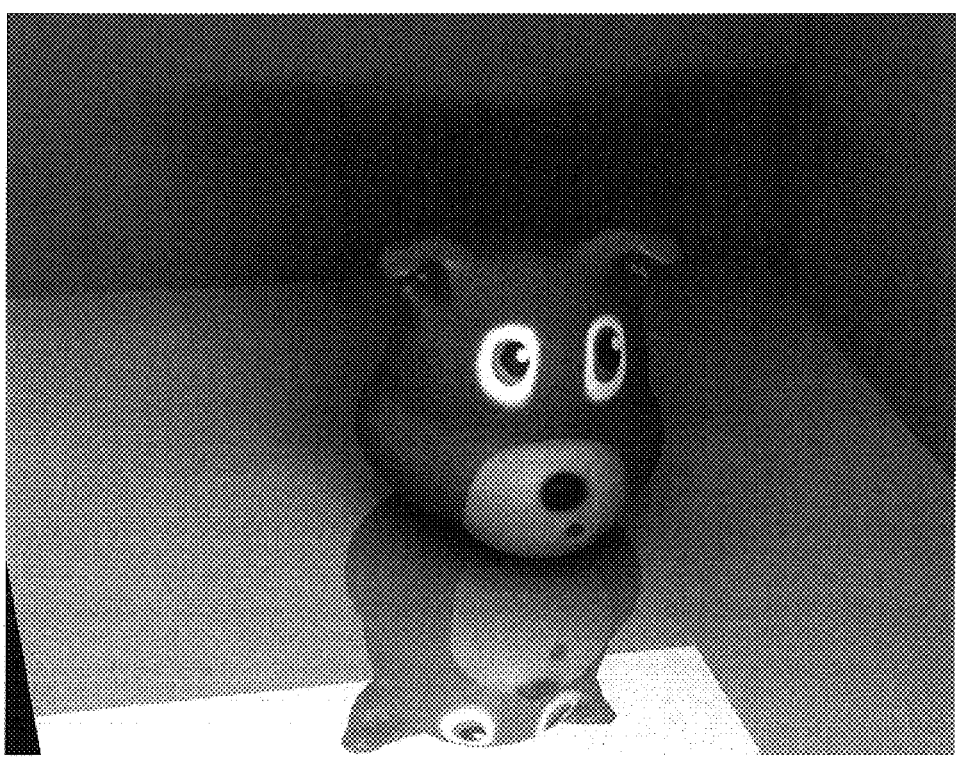
FIG. 23 is an image of the virtual object of FIG. 22, wherein the surface of the virtual object has been painted by a user in object space using a texture mapping method, according to an illustrative embodiment of the invention.

FIGS. 22 and 23 demonstrate an improvement obtained using graphical rendering methods of the invention. Both FIGS. 22 and 23 feature the same virtual object whose surface has been painted by a user in object space. FIG. 22 is an image 2200 of a virtual object whose surface has been painted using a vertex painting method. A vertex painting method assigns color values to vertices of surface elements of the object and assigns either averaged or interpolated color values to pixels of the surface elements. There is poor resolution of the painted features on the surface of the virtual object, particularly on relatively flat features of the object such as the face, where surface elements are large.

FIG. 23 shows an image 2300 of the virtual object, where the surface of the virtual object has been painted by a user in object space using the texture mapping methods of the invention. Improved resolution is achieved by employing texture mapping methods of the invention. As seen in FIGS. 22 and 23, lighting, shadowing, and mirroring effects may be added in the rendering of a virtual object.

Figure 24:
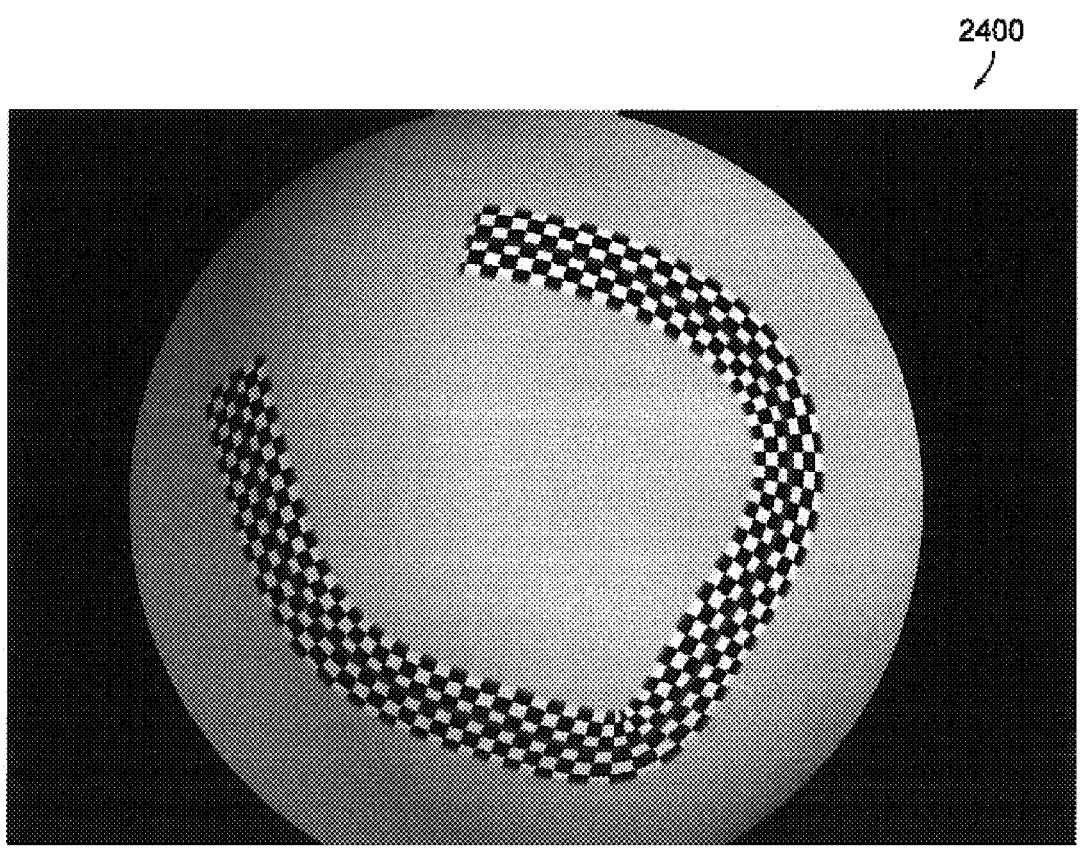
FIG. 24 is an image of a spherical virtual object with a periodic texture applied along a curved brush stroke, according to an illustrative embodiment of the invention.

FIG. 24 is an image of a spherical virtual object with a periodic texture applied along a curved brush stroke. The periodic checkerboard pattern is used in place of the falloff brush stroke in the texture rendering methods described herein, for example, with regard to FIGS. 18 and 19. FIG. 24 demonstrates the blending of a paint layer with a scratch layer, wherein the paint layer is not simply a monochromatic color. In FIG. 24, the blending of the paint layer and scratch layer form a checkerboard pattern about the width of the brush stroke, whose center is indicated by a red line.

Figure 25:
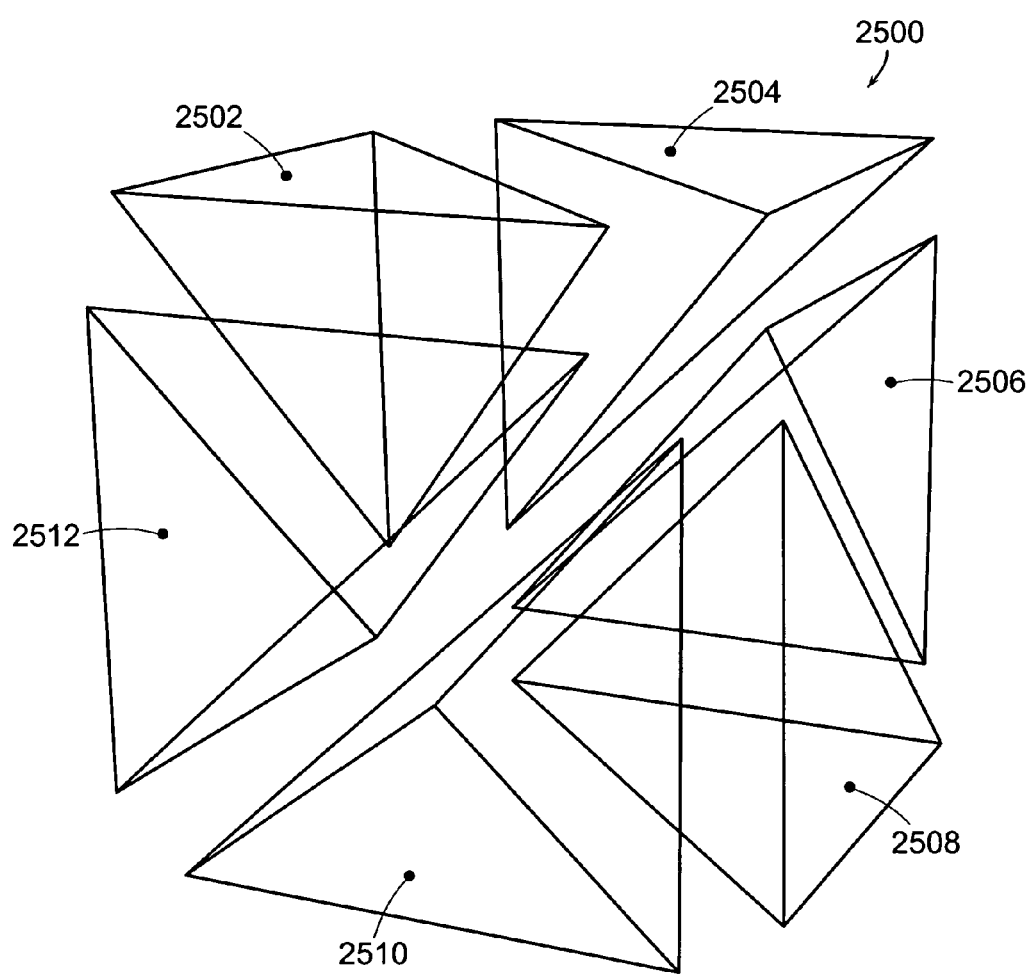
FIG. 25 is a schematic diagram illustrating the division of a voxel into six tetrahedra, used in performing a marching tetrahedra algorithm to generate a surface mesh for a virtual object, according to an illustrative embodiment of the invention.

FIG. 25 is a schematic diagram illustrating the division of a voxel into six tetrahedra, used in performing a marching tetrahedra algorithm to generate a surface mesh for a virtual object. As discussed elsewhere herein, an index is produced for each surface-containing voxel resulting from a mesh generation algorithm. The index corresponds to one of a finite number of surface element configurations, where the number of possible configurations depends on the mesh generation algorithm employed. In one example, the index is a marching tetrahedra index, derived from an implementation of a marching tetrahedra algorithm used to generate a surface mesh for a virtual object. By splitting up a cube into multiple tetrahedra, triangle vertices may lie along a diagonal of the voxel cube, increasing the resolution of the triangle mesh while keeping the resolution of the voxel grid constant.

The sampling structure in a marching tetrahedra approach is a tetrahedron. Samples are at the vertices on a rectangular grid, where a mesh cell is made up of eight samples of the grid, and the mesh cell is split into six tetrahedra that tile the cell. FIG. 25 shows a mesh cell 2500 that is split into six tetrahedra 2502, 2504, 2506, 2508, 2510, 2512, where vertices of the tetrahedra coincide with vertices of the cube. The configuration of triangular surface elements through each tetrahedron is determined by a lookup table. The index into the lookup table for a given tetrahedron is determined from values at the four vertices of the tetrahedron, where each value indicates whether the vertex is interior or exterior to the isosurface of the virtual object being meshed. The sum of all triangular surface elements for all tetrahedra of a given cube tile the cube. The sum of all triangular surface elements for all the cubes tile the object space.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of interactively representing application by a user of at least one brush stroke directly onto a virtual object in object space, the method comprising the steps of:
   (a) allocating a plurality of texture elements in two dimensional texture space for a plurality of jacks of a virtual object;
   (b) graphically rendering the allocated texture in real time as a user applies at least one brush stroke onto the virtual object as represented in object space, wherein the rendering step comprises creating at least one blended texture that is at least temporarily bound to a graphics application during the rendering; and
   (c) updating at least one of the blended textures according to the at least one brush stroke applied by the user, wherein the method further comprises:

(i) using an index corresponding to each of a plurality of jacks of the virtual object to identify texture elements to which surface elements of the virtual object are mapped; or
(ii) allocating texture in the texture space for at least one newly-created jack of the virtual object following an object modification; and
(iii) blending a set of texture layers corresponding to a first of a plurality of texture regions in the texture space and binding the blended texture to the graphics application during rendering of the first texture region.

2. The method of claim 1, wherein the method further comprises at least two of:
(i) using an index corresponding to each of a plurality of jacks of the virtual object to identify texture elements to which surface elements of the virtual object are mapped;
(ii) allocating texture in the texture space for at least one newly-created jack of the virtual object following an object modification; and
(iii) blending a set of texture layers corresponding to a first of a plurality of texture regions in the texture space and binding the blended texture to the graphics application during rendering of the first texture region.

3. The method of claim 1, wherein the method further comprises:
(i) using an index corresponding to each of a plurality of jacks of the virtual object to identify texture elements to which surface elements of the virtual object are mapped;
(ii) allocating texture in the texture space for at least one newly-created jack of the virtual object following an object modification; and
(iii) blending a set of texture layers corresponding to a first of a plurality of texture regions in the texture space and binding the blended texture to the graphics application during rendering of the first texture region.

4. The method of claim 1, wherein the at least one brush stroke comprises at least one member selected from the group consisting of a paint stroke, an erase stroke, a pencil stroke, a pen stroke, a line application, a character application, and a text application.

5. The method of claim 1, further comprising the step of:
(d) haptically rendering the virtual object in real time as the user applies the at least one brush stroke onto the virtual object.

6. The method of claim 5, further comprising the step of:
(e) determining force corresponding to a position of a haptic interface device held by the user as the user applies the at least one brush stroke onto the virtual object.

7. The method of claim 6, further comprising the step of:
(f) providing the force to the user through the haptic interface device as the user applies the at least one brush stroke onto the virtual object.

8. The method of claim 5, wherein step (d) is performed at a substantially faster rate than step (b).

9. The method of claim 5, wherein step (d) is performed within a range from about 700 Hz to about 1500 Hz and wherein step (b) is performed within a range from about 5 Hz to about 150 Hz.

10. The method of claim 9, wherein step (d) is performed at about 1000 Hz and wherein step (b) is performed at up to about 40 Hz.

11. The method of claim 5, wherein step (b) and step (d) are performed by different threads.

* * * * *